(12) United States Patent
Moon et al.

(10) Patent No.: US 11,064,576 B2
(45) Date of Patent: Jul. 13, 2021

(54) INDUCTION HEATING AND WIRELESS POWER TRANSFERRING DEVICE HAVING IMPROVED RESONANT CURRENT DETECTION ACCURACY

(71) Applicant: LG Electronics Inc., Seoul (KR)

(72) Inventors: Hyunwook Moon, Seoul (KR); Eui Sung Kim, Seoul (KR); Seungbok Ok, Seoul (KR)

(73) Assignee: LG Electronics Inc., Seoul (KR)

( * ) Notice: Subject to any disclaimer, the term of this patent is extended or adjusted under 35 U.S.C. 154(b) by 300 days.

(21) Appl. No.: 16/165,061

(22) Filed: Oct. 19, 2018

(65) Prior Publication Data

US 2019/0124727 A1 Apr. 25, 2019

(30) Foreign Application Priority Data

Oct. 19, 2017 (KR) .................. 10-2017-0136078
Dec. 15, 2017 (KR) .................. 10-2017-0173672

(51) Int. Cl.
*H05B 6/06* (2006.01)
*H05B 6/12* (2006.01)
(Continued)

(52) U.S. Cl.
CPC .............. *H05B 6/065* (2013.01); *H02J 7/025* (2013.01); *H02J 50/12* (2016.02); *H02J 50/40* (2016.02);
(Continued)

(58) Field of Classification Search
CPC ...... H05B 6/065; H05B 6/1272; H05B 6/062; H05B 2213/05; H02J 50/12; H02J 7/025; H02J 50/90; H02J 50/40; H01F 38/14
(Continued)

(56) References Cited

U.S. PATENT DOCUMENTS

2007/0279002 A1 12/2007 Partovi
2008/0049470 A1* 2/2008 Ishio ..................... H05B 6/062
363/78

(Continued)

FOREIGN PATENT DOCUMENTS

| EP | 2932794 | 10/2015 |
| GB | 2183941 | 6/1987 |
| WO | WO2017175321 | 10/2017 |

OTHER PUBLICATIONS

European Office Action in European Appln. No. 18201153.6, dated Jun. 30, 2020, 7 pages.
(Continued)

*Primary Examiner* — Quang T Van
(74) *Attorney, Agent, or Firm* — Fish & Richardson P.C.

(57) ABSTRACT

Disclosed is a device configured to inductively heat one or more objects and to wirelessly transfer power to one or more objects. The device includes a first working coil, an inverter unit configured to cause a resonant current to flow in the first working coil by performing a switching operation, a first detection unit connected to the first working coil and configured to detect the resonant current applied to the first working coil, and a control unit configured to: determine whether a target object is located at a location corresponding to the first working coil by controlling operation of the inverter unit and the first detection unit; or to control output of the first working coil.

17 Claims, 10 Drawing Sheets

(51) Int. Cl.
*H05B 6/04* (2006.01)
*H02M 1/42* (2007.01)
*H02J 50/12* (2016.01)
*H02J 7/02* (2016.01)
*H02J 50/90* (2016.01)
*H02J 50/40* (2016.01)
*H01F 38/14* (2006.01)

(52) U.S. Cl.
CPC .............. *H02J 50/90* (2016.02); *H05B 6/062* (2013.01); *H05B 6/1272* (2013.01); *H01F 38/14* (2013.01); *H05B 2213/05* (2013.01)

(58) Field of Classification Search
USPC ....... 219/666, 663, 662, 661, 632, 625, 622, 219/620; 363/134, 132, 98, 97, 78; 323/350
See application file for complete search history.

(56) References Cited

U.S. PATENT DOCUMENTS

| | | |
|---|---|---|
| 2008/0084201 A1 | 4/2008 | Kojori |
| 2011/0000904 A1* | 1/2011 | Sakakibara .......... H05B 6/1209 219/624 |
| 2012/0194172 A1 | 8/2012 | Wallace, Jr. et al. |
| 2013/0027022 A1 | 1/2013 | Woelfel et al. |

OTHER PUBLICATIONS

Extended European Search Report in European Appln. No. 18201153.6, dated Mar. 8, 2019, 7 pages.

\* cited by examiner

INDUCTION HEATING AND WIRELESS POWER TRANSFERRING DEVICE HAVING IMPROVED RESONANT CURRENT DETECTION ACCURACY

CROSS-REFERENCE TO RELATED APPLICATIONS

This application claims priority to and the benefit of Korean Application No. 10-2017-0136078 filed on Oct. 19, 2017, and No. 10-2017-0173672 filed on Dec. 15, 2017, the entire contents of which are incorporated herein by reference.

FIELD

This application relates to an induction heating and wireless power transferring device having improved resonant current detection accuracy.

BACKGROUND

Various types of cooking utensils are used to heat food in homes and restaurants. For example, gas ranges use gas as a fuel. In some cases, a heating device may use electricity for heating an object such as, e.g., a cooking pot.

A method of heating an object to be heated using electricity can be divided into a resistance heating method and an induction heating method. For example, an electric resistance method may include transferring heat, which is generated when a current is passed through a metal-resistant wire or a non-metallic heating element such as silicon carbide, to an object by radiation or conduction. The induction heating method may include generating an eddy current in an object to be heated (for example, a cooking container) that is made of a metal component by using a magnetic field generated around a coil when a predetermined magnitude of high-frequency power is applied to the coil so that the object to be heated itself is heated.

Recently, technology for supplying power in a wireless manner has been developed and applied to electronic devices. In some cases, the electronic devices with wireless power transferring technology are charged by simply placing them on a charging pad without connecting them to a charging connector. In some cases, the electronic devices with the wireless power transferring technology may not require a cord or a charger, thereby improving portability of the electronic devices and reducing a size and weight of the electronic devices.

The wireless power transferring technology may use an electromagnetic induction method using a coil, a resonance method using resonance, or a radio wave radiation method in which electrical energy is converted into a microwave and transferred. The electromagnetic induction method includes transferring power by using electromagnetic induction between a primary coil provided in a device for transferring wireless power and a secondary coil provided in a device for receiving wireless power.

The induction heating method of the induction heating device as described above has substantially the same principle as the wireless power transferring technology using electromagnetic induction in that an object to be heated is heated by electromagnetic induction.

Accordingly, research and development of an induction heating and wireless power transferring device capable of selectively performing induction heating and wireless power transferring based on a user's needs have been actively conducted.

In order to heat each of a plurality of target objects (e.g., cooking containers) or to transfer power in a wireless manner to each of a plurality of target objects (e.g., wireless power receiving devices), the induction heating and wireless power transferring device may include working coils in corresponding regions, respectively.

FIGS. 1 and 2 illustrate example induction heating devices in related art.

In the induction heating device illustrated in FIG. 1, a magnitude of resonant current is determined by changing the resonant current (that is, resonant current converted by inverter switch elements Q1 and Q2) into a voltage through a shunt resistor (Rs) that is connected in series to the inverter switch elements Q1 and Q2.

In this example, a shunt resistance value may be small based on a voltage range and a maximum magnitude of resonant current, which are measurable by a controller 114. In some cases, it may be difficult to measure a small magnitude of resonant current.

In the induction heating device in related art illustrated in FIG. 2, a magnitude of resonant current is determined by lowering a level of the resonant current to a level measurable by a controller 11 based on a transformation ratio of a current transformer (CT) 14 that is connected in series to a resonant circuit unit, and then changing the resonant current into a voltage through a shunt resistor 13.

In this example, the CT 14 may have a transformation ratio of several hundreds to one in consideration of a value, capacity, and magnetic flux saturation of the shunt resistor 13. Such a large transformation ratio of the CT 14 may cause a contradiction in determining a shunt resistance value. For instance, the shunt resistance value should be large in order to measure a small magnitude of resonant current, while the shunt resistance value should be small in order to measure a large magnitude of resonant current.

In some cases when the shunt resistance value is selected to be large and a large magnitude of resonant current flows, an overvoltage may occur at both ends of the shunt resistor. In some cases when the shunt resistance value is selected to be small and a small magnitude of resonant current flows, a value of the voltage applied to the shunt resistor may be beyond a voltage range measurable by the controller 11.

Recently, an induction heating and wireless power transferring device (i.e., a zone free type induction heating and wireless power transferring device) in which a single target object is simultaneously heated by a plurality of working coils, or power is simultaneously transferred to the single target object in a wireless manner through the plurality of working coils has been widely used.

In the zone free type induction heating and wireless power transferring device, a target object may be inductively heated or power may be transferred to the target object in a wireless manner regardless of a size and a location of the target object within a region where the plurality of working coils are present.

FIG. 3 is a block diagram illustrating an example zone free type induction heating and wireless power transferring device in related art.

As illustrated in FIG. 3, a zone free type induction heating and wireless power transferring device 10 has a structure in which individual relays R1-R4 (for example, a three-terminal relay) are respectively connected to a plurality of working coils WC1-WC4 in order to independently distinguish the plurality of working coils WC1-WC4 from one another and perform a circuit switching operation for a target object detecting operation. In some cases, noise may occur during the switching operation of the relays R1-R4.

In some cases when the target object is located over different working coil groups (for example, WC1-WC4), first and second group relays 35 and 40 may be switched so that both of them are connected to a first inverter unit 25 or a second inverter unit 30 for synchronization control of the working coils WC1-WC4. In this case, noise may occur due to the switching operation of the group relays.

In some cases, a volume of circuitry may become large because the group relays 35 and 40, the individual relays R1-R4, and a target object detection circuit 45 provided to detect the target object may occupy a large portion of an area of the circuit.

SUMMARY

Disclosed is an induction heating and wireless power transferring device that can reduce a volume of a circuit and a noise that may occur when a relay switching operation is performed by removing a relay and a target object detection circuit.

According to one aspect of the subject matter described in this application, a device is configured to inductively heat one or more objects and to wirelessly transfer power to one or more objects. The device includes a first working coil, an inverter unit configured to cause a resonant current to flow in the first working coil by performing a switching operation, a first detection unit connected to the first working coil and configured to detect the resonant current applied to the first working coil, and a control unit configured to: determine whether a target object is located at a location corresponding to the first working coil by controlling operation of the inverter unit and the first detection unit; or control output of the first working coil.

Implementations according to this aspect may include one or more of the following features. For example, the first detection unit includes a current transformer connected to the first working coil and configured to change a magnitude of the resonant current applied to the first working coil, a first resistor connected to the current transformer, the first resistor having a first resistance value, a second resistor connected to the first resistor, the second resistor having a second resistance value less than the first resistance value, and a control switch connected to the second resistor and configured to selectively allow flow of current through the second resistor, where the control unit is configured to control operation of the control switch.

In some implementations, the first resistor is configured to, based on the control unit turning off the control switch, convert the resonant current to a first voltage, the resonant current having the magnitude changed by the current transformer. In some examples, the first resistor and the second resistor are configured to, based on the control unit turning on the control switch, convert the resonant current to a second voltage according to a composite resistance value of the first resistor and the second resistor, the resonant current having the magnitude changed by the current transformer. In some examples, the control unit is further configured to: based on the first voltage, determine whether the target object is located at the location corresponding to the first working coil; and based on the second voltage, control output of the first working coil.

In some implementations, the control unit is further configured to: turn on the control switch by supplying a first level signal to the control switch; and turn off the control switch by supplying a second level signal to the control switch, the second level being different from the first level. For example, the first level signal may corresponding to a higher voltage level than the second level signal. In some examples, the first detection unit further includes a pull-up resistor that is configured to invert a high level signal to a low level signal and that is configured to invert the low level signal to the high level signal, where the control unit is further configured to: turn off the control switch by supplying the high level signal to the control switch; and turn on the control switch by supplying the low level signal to the control switch.

In some implementations, the first detection unit further includes: a sub-rectification unit connected to the first resistor and to the second resistor, the sub-rectification unit being configured to rectify a first voltage converted through the first resistor or to rectify a second voltage converted through the first resistor and the second resistor; a voltage distribution unit configured to generate a distribution voltage by converting a level of the rectified first voltage or a level of the rectified second voltage, the distribution voltage having a voltage level within a voltage measurement range of the control unit; and a sub-filter unit configured to filter the distribution voltage and to supply the filtered distribution voltage to the control unit, the sub-filter unit including a diode configured to limit the voltage level provided to the control unit.

In some implementations, the control unit is further configured to: receive the distribution voltage from the voltage distribution unit; convert the received distribution voltage into a pulse signal; based on the pulse signal, determine whether the target object is located at the location corresponding to the first working coil; and control output of the first working coil based on the filtered distribution voltage supplied from the sub-filter unit.

In some implementations, the first detection unit further includes: a first sub-rectification unit connected to the first resistor and to the second resistor, the first sub-rectification unit being configured to rectify a first voltage converted through the first resistor and the second resistor; a first voltage distribution unit configured to generate a first distribution voltage by converting a level of the rectified first voltage to a first voltage level within a voltage measurement range of the control unit; a sub-filter unit configured to filter the first distribution voltage and to supply the filtered first distribution voltage to the control unit, the sub-filter unit including a diode configured to limit the first voltage level provided to the control unit; a second sub-rectification unit connected to the first resistor and to the second resistor, the second sub-rectification unit being configured to rectify a second voltage converted through the first resistor; a second voltage distribution unit configured to generate a second distribution voltage by converting a level of the rectified second voltage to a second voltage level within the voltage measurement range of the control unit; and a pulse conversion unit configured to convert the second distribution voltage into a pulse signal and to supply the pulse signal to the control unit.

In some implementations, the control unit is further configured to: determine whether the target object is located at the location corresponding to the first working coil based on the pulse signal supplied from the pulse conversion unit; and control output of the first working coil based on the filtered first distribution voltage supplied from the sub-filter unit. In some examples, the current transformer is connected electrically in series to the first working coil, the first resistor is connected electrically in parallel to the current transformer, the second resistor is connected electrically in parallel to the first resistor, and the control switch is connected electrically in series to the second resistor.

In some implementations, the device further includes: a second working coil connected electrically in parallel to the first working coil; a first semiconductor switch connected to the first working coil and configured to turn on the first working coil and to turn off the first working coil; a second semiconductor switch connected to the second working coil and configured to turn on the second working coil and to turn off the second working coil; and a second detection unit connected to the second working coil. The inverter unit may be further configured to cause the resonant current to flow in at least one of the first working coil or the second working coil by performing the switching operation. The second detection unit may be configured to detect the resonant current applied to the second working coil. The control unit may be further configured to: based on controlling operation of the inverter unit, the first semiconductor switch, the second semiconductor switch, the first detection unit, and the second detection unit, determine whether an object is located at a first position corresponding to the first working coil or a second position corresponding to the second working coil; or control output of at least one of the first working coil or the second working coil.

In some implementations, the control unit is further configured to, based on a determination that the target object is located at the location corresponding to the first working coil, control output of the first working coil. In some examples, the inverter unit includes a plurality of switching elements connected electrically in parallel to a power supply unit and configured to perform the switching operation to cause resonance in the first working coil.

In some implementations, the plurality of switching elements includes a first switching element and a second switching element, where the first working coil is connected to a node between the first switching element and the second switching element. In some examples, the control unit is further configured to: determine a type of the target object; and based on the type of the target object, control the first working coil to heat the target object or to electrically charge the target object.

In some implementations, the control unit is further configured to, based on a number of pulses or a frequency of the resonant current, determine whether the target object is present at the location corresponding to the first working coil. In some examples, the control unit is further configured to, based on the number of pulses or the frequency of the resonant current, determine a relative position of the target object with respect to a center of the first working coil.

In some implementations, the control unit is further configured to: based on a determination that the object is located at the first position corresponding to the first working coil, control output of the first working coil; and based on a determination that the object is located at the second position corresponding to the second working coil, control output of the second working coil. In some implementations, the device further includes: a power supply unit configured to supply power to the inverter unit; and an auxiliary power supply configured to supply power to the first semiconductor switch and to the second semiconductor switch.

Particular implementations of the subject matter described in this specification can be implemented so as to realize one or more of the following advantages.

The induction heating and wireless power transferring device may include a detection unit that is configured to detect various magnitudes of resonant currents applied to a working coil through first and second shunt resistors that are selectively driven, thereby improving resonant current detection accuracy.

Further, the induction heating and wireless power transferring device may perform a target object detecting operation and a working coil output control operation by using the semiconductor switch, the detection unit and the control unit instead of the relay and the target object detection circuit, thereby solving a noise problem occurring when the relay switching operation is performed and reducing a volume of a circuit.

The induction heating and wireless power transferring device may independently distinguish the plurality of working coils from one another through the semiconductor switch and the control unit, and accordingly may turn on or off the working coils at high speed, thereby improving target object detection speed and algorithm.

Further, the induction heating and wireless power transferring device may detect various magnitudes of resonant currents through the first and second shunt resistors that are selectively driven, thereby improving the resonant current detection accuracy. Furthermore, it is possible to improve accuracy in relation to the target object detecting operation and the working coil output control operation by improving the resonant current detection accuracy.

Also, the induction heating and wireless power transferring device may perform the target object detecting operation and the working coil output control operation by using the semiconductor switch, the detection unit and the control unit instead of the relay and the target object detection circuit, thereby solving a noise problem occurring when the switching operation of the relay is performed. As a result, it is possible to improve user satisfaction. Further, the induction heating and wireless power transferring device may improve ease of use because the user may use the induction heating and wireless power transferring device quietly during noise-sensitive time zones (for example, at dawn or late at night). In addition, the induction heating and wireless power transferring device may reduce a volume of the circuit by removing the relay and the target object detection circuit that occupy a large portion of the area of the circuit, thereby reducing an overall volume of the induction heating and wireless power transferring device. As a result, it is possible to improve space utilization.

In addition to the advantages described above, other advantages are described below with reference to relevant figures.

DETAILED DESCRIPTION

Figure 1:
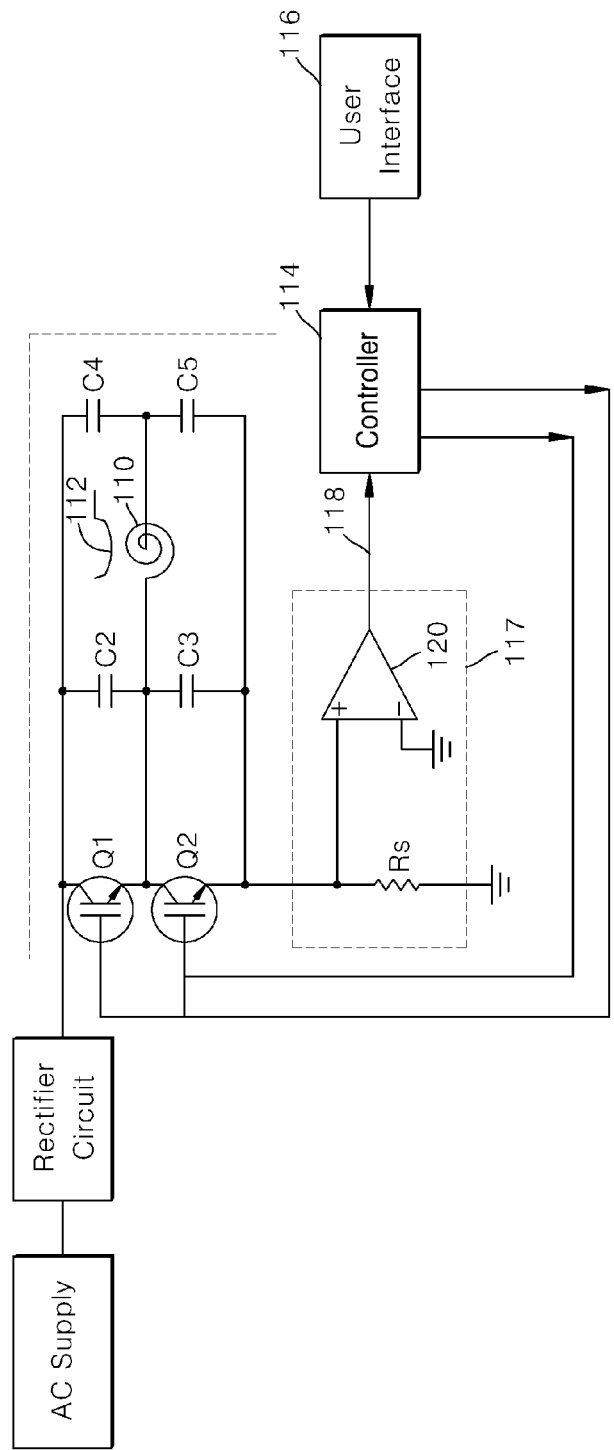
FIGS. 1 and 2 are diagrams illustrating example induction heating devices in related art.
Figure 2:
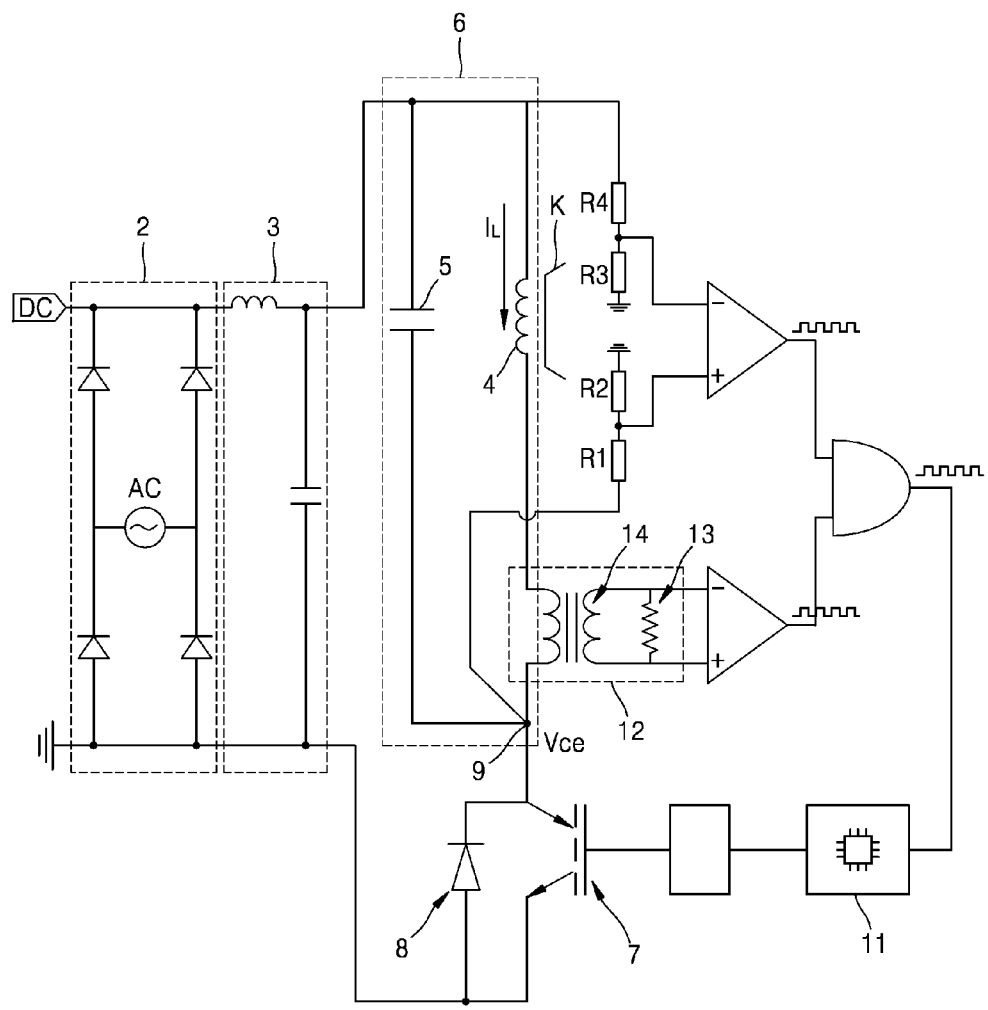
Figure 3:
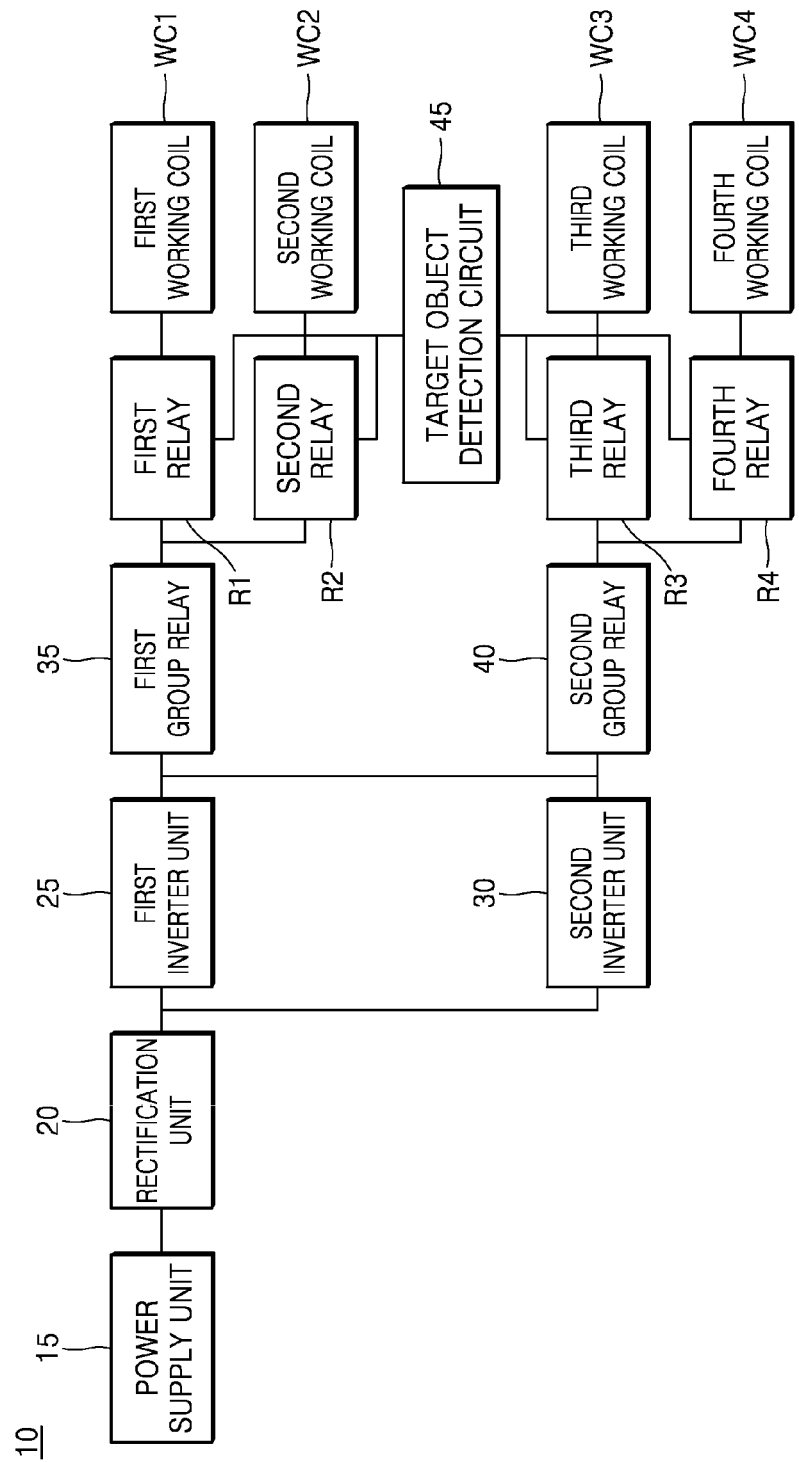
FIG. 3 is a block diagram illustrating an example zone free type induction heating and wireless power transferring device in related art.

Hereinafter, example implementations of this application will be described with reference to the accompanying drawings. In the drawings, the same reference numerals are used to indicate the same or similar components.

Hereinafter, an induction heating and wireless power transferring device according to an implementation of this application will be described.

Figure 4:
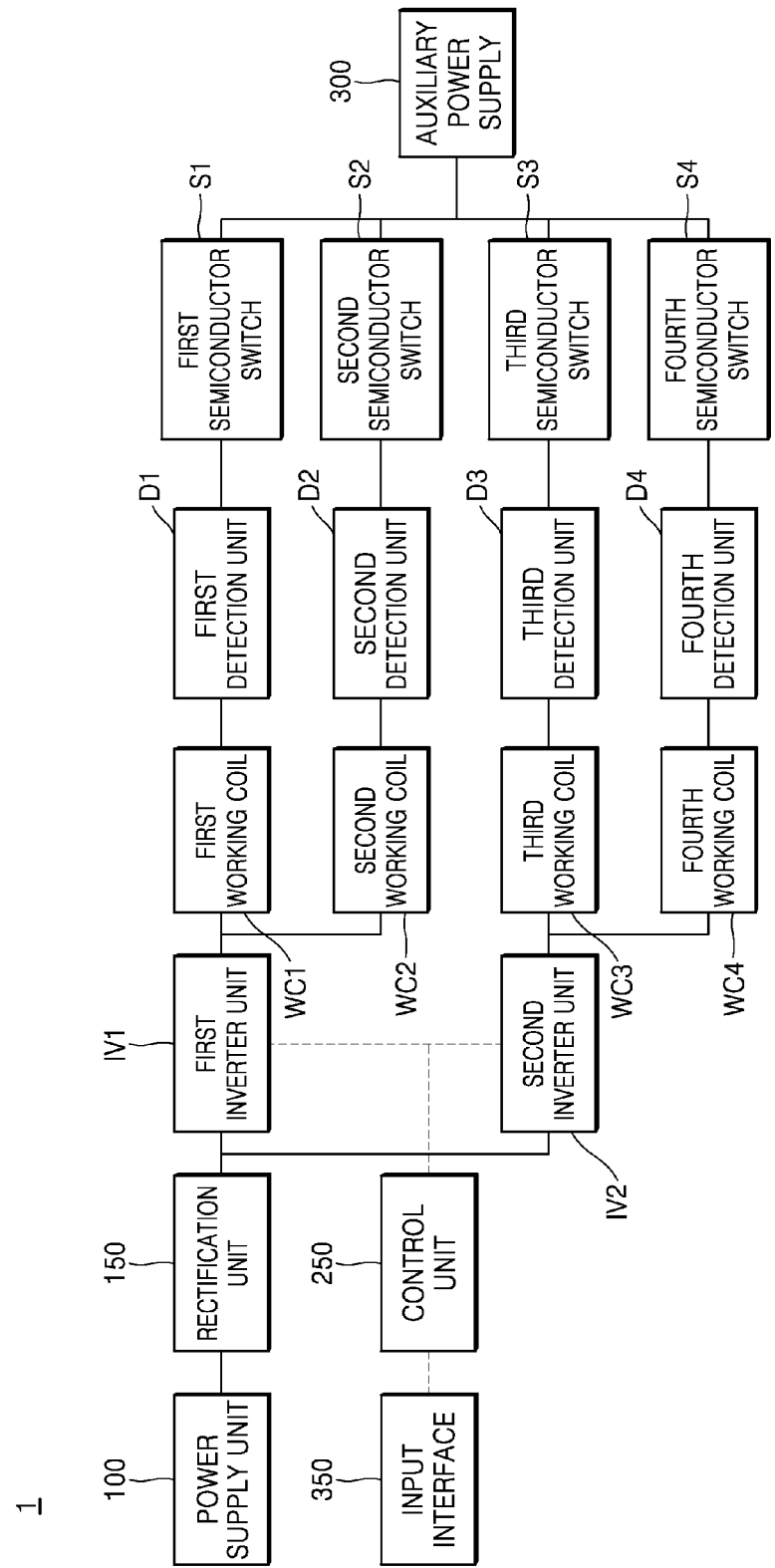
FIG. 4 is a block diagram illustrating an example induction heating and wireless power transferring device according to this application.

FIG. 4 is a block diagram illustrating an example inducting heating and wireless power transferring device.

Referring to FIG. 4, an induction heating and wireless power transferring device 1 may include a power supply unit 100, a rectification unit 150, first and second inverter units IV1 and IV2, a control unit 250, first to fourth working coils WC1-WC4, first to fourth detection units D1-D4, first to fourth semiconductor switches S1-S4, an auxiliary power supply 300, and an input interface 350.

In some implementations, the number of some components (for example, an inverter unit, working coil, semiconductor switch, and the like) of the induction heating and wireless power transferring device 1 illustrated in FIG. 4 may be changed.

The power supply unit 100 may output alternating current (AC) power.

Specifically, the power supply unit 100 may output AC power and supply the AC power to the rectification unit 150, and may be, for example, a commercial power source.

The rectification unit 150 may convert the AC power supplied from the power supply unit 100 into direct current (DC) power and supply the DC power to at least one of the first inverter unit IV1 and the second inverter unit IV2.

Specifically, the rectification unit 150 may rectify the AC power supplied from the power supply unit 100 and convert the rectified AC power into DC power.

In some implementations, the DC power rectified by the rectification unit 150 may be supplied to a filter unit, and the filter unit may remove an AC component remaining in the corresponding DC power. For example, the DC power rectified by the rectification unit 150 may be supplied to a DC link capacitor (e.g., a smoothing capacitor), and the DC link capacitor may reduce ripple of the corresponding DC power.

Thus, the DC power rectified by the rectification unit 150 and the filter unit (or the DC link capacitor) may be supplied to at least one of the first and second inverter units IV1 and IV2.

The first inverter unit IV1 may perform a switching operation to apply a resonant current to at least one of the first and second working coils WC1 and WC2.

Specifically, the switching operation of the first inverter unit IV1 may be controlled by the control unit 250. That is, the first inverter unit IV1 may perform the switching operation based on a switching signal supplied from the control unit 250.

In some implementations, the first inverter unit IV1 may include two switching elements, and the two switching elements may be alternately turned on and off by the switching signal supplied from the control unit 250.

Further, the switching operation of these two switching elements may generate a high-frequency AC (i.e., a resonant current), and the generated high-frequency AC may be applied to at least one of the first and second working coils WC1 and WC2.

In the same manner, the second inverter unit IV2 may perform a switching operation to apply a resonant current to at least one of the third and fourth working coils WC3 and WC4.

Specifically, the switching operation of the second inverter unit IV2 may be controlled by the control unit 250. That is, the second inverter unit IV2 may perform the switching operation based on the switching signal supplied from the control unit 250.

In some implementations, the second inverter unit IV2 may include two switching elements, and the two switching elements may be alternately turned on and off by the switching signal supplied from the control unit 250.

Further, the switching operation of these two switching elements may generate high-frequency AC (i.e., a resonant current), and the generated high-frequency AC may be applied to at least one of the third and fourth working coils WC3 and WC4.

The control unit 250 may control respective operations of the first and second inverter units IV1 and IV2, the first to fourth detection units D1-D4, and the first to fourth semiconductor switches S1-S4.

Specifically, the switching operations of the first and second inverter units IV1 and IV2 may be controlled in response to the switching signal of the control unit 250, and the first to fourth semiconductor switches S1-S4 may be turned on or off in a sequential order, in a particular order, or simultaneously in response to a control signal of the control unit 250.

For example, when the first inverter unit IV1 is driven by the switching signal of the control unit 250 and the first semiconductor switch S1 is turned on by the control signal of the control unit 250, a resonant current may be applied to the first working coil WC1.

Thus, an object, e.g., a target object, that is located on the first working coil WC1 may be heated, or power may be transferred to the target object in a wireless manner by the resonant current applied to the first working coil WC1.

In some implementations, the control unit 250 may generate various switching signals or control signals via a pulse width modulation (PWM) function.

Further, the control unit 250 may control a driving mode of the induction heating and wireless power transferring device 1, i.e., an induction heating mode or a wireless power transferring mode.

That is, when the driving mode of the induction heating and the wireless power transferring device 1 is set to the wireless power transferring mode by the control unit 250, at least one of the first to fourth working coils WC1-WC4 may be driven to transfer power to a target object in a wireless manner.

On the other hand, when the driving mode of the induction heating and the wireless power transferring device 1 is set to the induction heating mode by the control unit 250, at least one of the first to fourth working coils WC1-WC4 may be driven to heat the target object.

Further, the control unit 250 may determine the number of working coils to be driven, and a transferred power amount or a heating intensity of the induction heating and wireless power transferring device 1 may vary depending on the number of working coils to be driven.

And, the control unit 250 may determine a working coil to be driven based on a location of the target object, and may also determine whether or not the switching signal between the working coils to be driven is synchronized.

And, the control unit 250 may determine a working coil with the target object located thereon among the first to fourth working coils WC1-WC4 based on resonant currents respectively detected by the first to fourth detection units D1-D4, or may control outputs of the first to fourth working coils WC1-WC4.

Details of a method to detect the target object by the control unit 250 will be described later.

And, the control unit 250 may determine whether the target object is a magnetic body or a non-magnetic body based on values of the resonant currents detected by the first to fourth detection units D1-D4.

Specifically, when the target object mounted on the induction heating and wireless power transferring device 1 is a magnetic body, a large magnitude of eddy current may be induced from the working coil and resonated, so that a relatively small magnitude of resonant current may flow through the working coil. However, when the target object mounted on the induction heating and wireless power transferring device 1 is not present or is a non-magnetic body, the working coil is not resonated, so that a relatively large magnitude of resonant current may flow through the working coil.

Accordingly, when a magnitude of the resonant current flowing through the working coil is smaller than that of a predetermined reference current, the control unit 250 may determine that the target object is a magnetic body. Conversely, when the magnitude of resonant current flowing through the working coil is equal to or larger than that of the predetermined reference current, the control unit 250 may determine that the target object is a non-magnetic object or is not present.

The first and second working coils WC1 and WC2 may be connected in parallel to each other.

Specifically, the first and second working coils WC1 and WC2 may be connected in parallel to each other, and may receive a resonant current from the first inverter unit IV1.

That is, when the driving mode of the induction heating and wireless power transferring device 1 is the induction heating mode, high-frequency AC applied to at least one of the first and second working coils WC1 and WC2 from the first inverter unit IV1 may generate an eddy current between a corresponding working coil and the target object, and the generated eddy current may heat the target object.

Further, when the driving mode of the induction heating and wireless power transferring device 1 is the wireless power transferring mode, the high-frequency AC applied to at least one of the first and second working coils WC1 and WC2 from the first inverter unit IV1 may generate a magnetic field in a corresponding working coil. As a result, a current may flow through a coil provided in the target object that corresponds to the corresponding working coil, and the current flowing through the coil provided in the target object may charge the target object.

Further, the first working coil WC1 may be connected to the first semiconductor switch S1, and the second working coil WC2 may be connected to the second semiconductor switch S2.

Accordingly, the respective working coils may be turned on or off at high speed by the corresponding semiconductor switches.

In some implementations, a working coil is turned on or off by a semiconductor switch that is configured to unblock or block a flow of the resonant current applied from an inverter unit to the working coil.

Also, a resonant current applied to the first working coil WC1 may be detected by the first detection unit D1, and a resonant current applied to the second working coil WC2 may be detected by the second detection unit D2. A method to detect a resonant current by the first and second detection units D1 and D2 will be described later.

The third and fourth working coils WC3 and WC4 may be connected in parallel to each other.

Specifically, the third and fourth working coils WC3 and WC4 may be connected in parallel to each other, and may receive a resonant current from the second inverter unit IV2.

That is, when the driving mode of the induction heating and wireless power transferring device 1 is the induction heating mode, high-frequency AC applied to at least one of the third and fourth working coils WC3 and WC4 from the second inverter unit IV2 may generate an eddy current between a corresponding working coil and a target object, and the generated eddy current may heat the target object.

Further, when the driving mode of the induction heating and wireless power transferring device 1 is the wireless power transferring mode, the high-frequency AC applied to at least one of the third and fourth working coils WC3 and WC4 from the second inverter unit IV2 may generate a magnetic field in a corresponding working coil. As a result, a current may flow through a coil provided in a target object that corresponds to the corresponding working coil, and the current flowing through the coil provided in the target object may charge the target object.

Further, the third working coil WC3 may be connected to the third semiconductor switch S3, and the fourth working coil WC4 may be connected to the fourth semiconductor switch S4.

Accordingly, the respective working coils may be turned on or off at high speed by the corresponding semiconductor switches.

Also, a resonant current applied to the third working coil WC3 may be detected by the third detection unit D3, and a resonant current applied to the fourth working coil WC4 may be detected by the fourth detection unit D4.

A method to detect a resonant current by the third and fourth detection units D3 and D4 will be described later.

The first to fourth semiconductor switches S1-S4 may be respectively connected to the first to fourth working coils WC1-WC4 to respectively turn on or off the first to fourth working coils WC1-WC4, and may be supplied with power from the auxiliary power supply 300.

Specifically, the first semiconductor switch S1 may be connected to the first working coil WC1 to turn on or off the first working coil WC1, and the second semiconductor switch S2 may be connected to the second working coil WC2 to turn on or off the second working coil WC2. Also, the third semiconductor switch S3 may be connected to the third working coil WC3 to turn on or off the third working coil WC3, and the fourth semiconductor switch S4 may be connected to the fourth working coil WC4 to turn on or off the fourth working coil WC4.

Further, the first and second semiconductor switches S1 and S2 may be driven in line with the first inverter unit IV1 by the control unit 250 to detect whether or not a target object is present on the first and second working coils WC1 and WC2 or to control outputs of the first and second working coils WC1 and WC2.

Further, the third and fourth semiconductor switches S3 and S4 may be driven in line with the second inverter unit IV2 by the control unit 250 to detect whether or not a target object is present on the third and fourth working coils WC3 and WC4 or to control outputs of the third and fourth working coils WC3 and WC4.

In some implementations, the first to fourth semiconductor switches S1-S4 may include, for example, a static switch. Also, for example, a metal oxide semiconductor field effect transistor (MOSFET) or an insulated gate bipolar mode transistor (IGBT) may be applied to the first to fourth semiconductor switches S1-S4.

The auxiliary power supply 300 may supply power to the first to fourth semiconductor switches S1-S4.

Specifically, the auxiliary power supply 300 may have a single output structure (i.e., one output terminal). Therefore, the auxiliary power supply 300 may supply power to the first to fourth semiconductor switches S1-S4 with a single output. Also, the auxiliary power supply 300 may reduce the number of pins required for connection with the first to fourth semiconductor switches S1-S4 in comparison to a multiple output structure.

When a single output capacity is too large (that is, when the single output capacity is significantly out of a predetermined reference capacity), the auxiliary power supply 300 may be designed to have a double output structure (a structure in which each output terminal divides the single output capacity into capacities which are less than or equal to the predetermined reference capacity and outputs).

In some implementations, the auxiliary power supply 300 may include, for example, a switched mode power supply (SMPS), but is not limited thereto.

The input interface 350 may receive an input from a user and supply the input to the control unit 250.

Specifically, the input interface 350, which is a module for inputting a heating intensity and a driving time of the induction heating and the wireless power transferring device 1 desired by a user, may be implemented in various ways such as a physical button, a touch panel or the like.

In addition, the input interface 350 may be provided with a power button, a lock button, a power level adjustment button (+, −), a timer adjustment button (+, −), a charging mode button, and the like.

The input interface 350 may supply the supplied input information to the control unit 250, and the control unit 250 may drive the induction heating and wireless power transferring device 1 in various ways on the basis of the input information supplied from the input interface 350. The following is an example of the induction heating and wireless power transferring device 1 being driven in various ways.

When the user touches the power button provided in the input interface 350 for a certain period of time in a state where the induction heating and wireless power transferring device 1 is not driven, the driving of the induction heating and the wireless power transferring device 1 may be started. Conversely, when the user touches the power button for a certain period of time in a state where the induction heating and wireless power transferring device 1 is driven, the driving of the induction heating and the wireless power transferring device 1 may be terminated.

Further, when the user touches the lock button for a certain period of time, all the other buttons may not be operated. Thereafter, when the user touches the lock button again for a certain period of time, all the other buttons may be operated.

Further, when the user touches the power level adjustment button (+, −) in a state where power is input, a current power level of the induction heating and wireless power transferring device 1 may be displayed numerically on the input interface 350. Also, by touch of the power level adjustment button (+, −), the control unit 250 may determine that the driving mode of the induction heating and wireless power transferring device 1 is the induction heating mode. The control unit 250 may adjust a frequency for the switching operations of the first and second inverter units IV1 and IV2 to correspond to the input power level.

Further, the user may touch the timer adjustment button (+, −) to set a driving time of the induction heating and wireless power transferring device 1. The control unit 250 may terminate the driving of the induction heating and the wireless power transferring device 1 when the driving time set by the user has elapsed.

At this time, when the induction heating and wireless power transferring device 1 operates in the induction heating mode, the driving time of the induction heating and wireless power transferring device 1 set by the timer adjustment button (+, −) may be a heating time of the target object.

Also, when the induction heating and wireless power transferring device 1 operates in the wireless power transferring mode, the driving time of the induction heating and wireless power transferring device 1 set by the timer adjustment button (+, −) may be a charging time of the target object.

When the user touches the charging mode button, the induction heating and wireless power transferring device 1 may be driven in the wireless power transferring mode.

At this time, the control unit 250 may receive device information about the target object through communication with the target object mounted in a driving region (i.e., an upper portion of the working coil). The device information transferred from the target object may include information such as, for example, a type of the target object, a charging mode, and an amount of required power.

Also, the control unit 250 may determine a type of the target object based on the received device information, and may recognize a charging mode of the target object.

In some implementations, the charging mode of the target object may include a normal charging mode and a high speed charging mode.

Accordingly, the control unit 250 may adjust a frequency of at least one of the first and second inverter units IV1 and IV2 based on the recognized charging mode. For example, in the high speed charge mode, the control unit 250 may adjust the frequency so that a large magnitude of resonant current is applied to the working coil in response to the switching operation of the inverter unit.

The charging mode of the target object may be input by the user through the input interface 350.

In some implementations, when the control unit 250 detects a target object (for example, a wireless power receiving device), the control unit 250 may control the input interface 350 to display a detection result of the detected target object and a wireless power transfer proposal for the target object through a user interface (UI). When a user provides an input for instructing wireless power transfer to the target object through the UI displayed on the input interface 350, the control unit 250 may drive the induction heating and wireless power transferring device 1 in the wireless power transferring mode based on the input.

The first to fourth detection units D1-D4 may be connected to the first to fourth working coils WC1-WC4, respectively, so as to detect resonant currents flowing through the corresponding working coils.

In some implementations, the first to fourth detection units D1-D4 may not exist separately, but exist in a form of one integrated detection unit. But, in implementations of this application, a configuration in which the first to fourth detection units D1-D4 exist separately will be described as an example for ease of explanation.

Specifically, the first detection unit D1 may be provided between the first working coil WC1 and the first semiconductor switch S1, and the second detection unit D2 may be provided between the second working coil WC2 and the second semiconductor switch S2. The third detection unit D3 may be provided between the third working coil WC3 and the third semiconductor switch S3, and the fourth detection unit D4 may be provided between the fourth working coil WC4 and the fourth semiconductor switch S4.

Also, the first detection unit D1 may detect the resonant current applied to the first working coil WC1 and supply information related to the detected resonant current to the control unit 250, and the second detection unit D2 may detect the resonant current applied to the second working coil WC2 and supply information related to the detected resonant current to the control unit 250. The third detection unit D3 may detect the resonant current applied to the third working coil WC3 and supply information related to the detected resonant current to the control unit 250, and the fourth detection unit D4 may detect the resonant current applied to the fourth working coil WC4 and supply information related to the detected resonant current to the control unit 250.

Here, an example of the detection unit of FIG. 4 will be described with reference to FIG. 5.

In some implementations, the first to fourth detection units D1-D4 have the same configuration, function and effect, and thus the first detection unit D1 will be described as an example.

Figure 5:
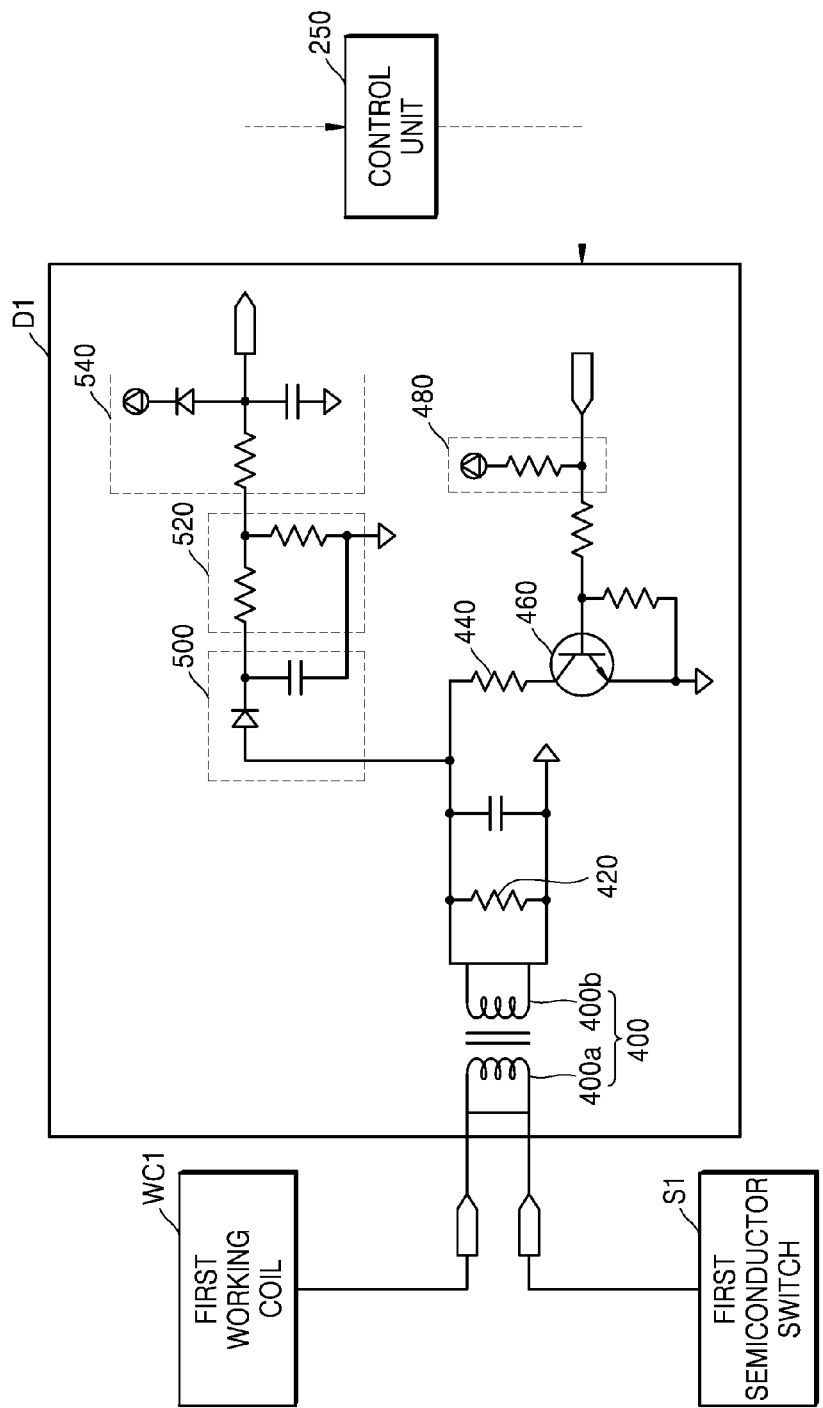
FIG. 5 is a schematic diagram illustrating an example of a detection unit of FIG. 4.

Specifically, referring to FIG. 5, the first detection unit D1 may include a current transformer 400, a first resistor 420, a second resistor 440, a control switch 460, a pull-up resistor 480, a sub-rectification unit 500, a voltage distribution unit 520, and a sub-filter unit 540.

The current transformer 400 may be connected in series to the first working coil WC1 to convert a magnitude of the resonant current applied to the first working coil WC1.

Specifically, the current transformer 400 may be connected between the first working coil WC1 and the first semiconductor switch S1.

In addition, the current transformer 400 may convert the resonant current flowing through the first working coil WC1 based on a transformation ratio of a first coil 400a and a second coil 400b. For example, when a turns ratio of the first coil 400a and the second coil 400b is 1:320, a magnitude of the resonant current 80A flowing through the first coil 400a may be converted into 1/320 (that is, conversion to 0.25 A).

In some implementations, the current transformer 400 may be used to reduce a magnitude of the resonant current flowing through the first working coil WC1 to a magnitude measurable by the control unit 250.

The first resistor 420 may be connected in parallel to the current transformer 400 and may have a first resistance value.

Specifically, the first resistor 420 may be connected in parallel to the current transformer 400 and may be used when determining whether or not the target object is located on the first working coil WC1.

Accordingly, the first resistance value may be set in consideration of a small magnitude of resonance current (e.g., a minimum magnitude of resonant current) used when detecting the target object.

Also, a voltage applied to the first resistor 420 has to be within a range measurable by the control unit 250, and thus the first resistance value may also be set in consideration thereof. As a result, it is possible to prevent an overvoltage from being applied to the first resistor 420.

In some implementations, the first resistor 420 may include, for example, a shunt resistor, but is not limited thereto.

The second resistor 440 may be connected in parallel to the first resistor 420 and may have a second resistance value less than the first resistance value.

Specifically, the second resistor 440 may be connected in parallel to the first resistor 420, i.e., the current transformer 400, and may be used to control an output of the first working coil WC1.

Accordingly, the second resistance value may be set in consideration of a large magnitude of resonant current (for example, a maximum magnitude of resonant current) used to control an output of the first working coil WC1.

Also, a voltage applied to the second resistor 440 has to be within a range measurable by the control unit 250, and thus the second resistance value may also be set in consideration thereof.

The second resistor 440 may be connected in series to the control switch 460, unlike the first resistor 420, and may be turned on or off by the control switch 460. Details thereof will be described later.

In some implementations, the second resistor 440 may include a shunt resistor, but is not limited thereto.

The control switch 460 may be connected in series to the second resistor 440 to turn on or off the second resistor 440, and an operation thereof may be controlled by the control unit 250.

Specifically, the control switch 460 may receive a control signal from the control unit 250 and may be turned on or off based on the control signal, and the second resistor 440 may be also turned on or off based on a state of the control switch 460.

For example, the second resistor 440 is configured to be turned on or off when the second resistor 440 is activated or deactivated by the control switch 460.

Also, a control method of the control unit 250 with respect to the control switch 460 may be changed depending on the presence or absence of the pull-up resistor 480.

For example, assuming that the pull-up resistor 480 illustrated in FIG. 5 is not included in the first detection unit D1, when the control unit 250 supplies a high level signal (for example, 1) to the control switch 460, the control switch 460 may be turned on. Also, when the control unit 250 supplies a low level signal (for example, 0) to the control switch 460, the control switch 460 may be turned off.

That is, when no pull-up resistor 480 is present, a basic state of the control switch 460 may be a turn-off state (i.e., low level or 0).

In some implementations, when the control switch 460 is turned off by the control unit 250, only the first resistor 420 may be activated, and accordingly a resonant current whose magnitude is converted by the current transformer 400 may be converted into a voltage. Also, when the control switch 460 is turned on by the control unit 250, both the first and second resistors 420 and 440 may be activated, and thus a resonant current whose magnitude is converted by the current transformer 400 may be converted into a voltage through a composite resistance of the second resistors 420 and 440.

That is, when the second resistor 440 is turned on by the control switch 460 in a state in which the first resistance value is greater than the second resistance value and the first and second resistors 420 and 440 are connected in parallel to each other, a composite resistance value of the first and second resistors 420 and 440 may approach the second resistance value.

For example, when the first resistance value is 10 kΩ and the second resistance value is 100Ω, a composite resistance value of the first resistance value and the second resistance value may be about 99Ω.

Accordingly, the control unit 250 may determine whether or not the target object is located on the first working coil WC1 based on the voltage (a voltage obtained by converting a small magnitude of resonant current) converted through the first resistor 420, and may control an output of the first working coil WC1 based on the voltage (a voltage obtained by converting a large magnitude of resonant current) converted through the composite resistance of the first and second resistors 420 and 440.

On the other hand, assuming that the pull-up resistor 480 configured to invert the control switch 460 is included in the first detection unit D1 as illustrated in FIG. 5, when the control unit 250 supplies high level signal (for example, 1) to the control switch 460, the control switch 460 may be turned off. Also, when the control unit 250 supplies a low level signal (for example, 0) to the control switch 460, the control switch 460 may be turned on.

That is, when the pull-up resistor 480 is present, a basic state of the control switch 460 may be a turn-on state (i.e., a high level or 1).

The sub-rectification unit 500 may be connected to the first and second resistors 420 and 440 to rectify a voltage converted through the first resistor 420 or the first and second resistors 420 and 440.

Specifically, the sub-rectification unit 500 may rectify an AC voltage converted through the first resistor 420 or the first and second resistors 420 and 440 to a DC voltage and supply the rectified voltage to the voltage distribution unit 520.

The voltage distribution unit 520 may convert a level of the voltage rectified by the sub-rectification unit 500 into a voltage level measurable by the control unit 250 (i.e., converting the voltage to be within a measurable voltage range).

Specifically, the voltage distribution unit 520 may convert a level of the voltage supplied from the sub-rectification unit 500 into a voltage level measurable by the control unit 250 and supply the converted voltage to the sub-filter unit 540.

Earlier, a level of the resonant current applied to the first working coil WC1 may be converted into a voltage level measurable by the control unit 250 through the current transformer 400, and thus the voltage distribution unit 520 may not be an essential component. That is, the voltage distribution unit 520 may be a component for preparing a case where a level of the resonant current is not converted to a voltage level measurable by the control unit 250 due to a malfunction or an error of the current transformer 400.

Accordingly, the first detection unit D1 may not include the voltage distribution unit 520. In implementations of this application, a configuration in which the first detection unit D1 includes the voltage distribution unit 520 will be described as an example.

The sub-filter unit 540 may filter the voltage whose level is converted by the voltage distribution unit 520 and supply the filtered voltage to the control unit 250, and may include a diode for preventing an overvoltage Specifically, the sub-filter unit 540 may filter the voltage supplied from the voltage distribution unit 520 (for example, removing noise from the voltage) and supply the filtered voltage to the control unit 250. Also, the sub-filter unit 540 may include a diode for preventing an overvoltage so as to prevent the voltage supplied from the voltage distribution unit 520 from being transferred to the control unit 250 in an overvoltage state.

In some implementations, the control unit 250 may determine whether or not the target object is located on the first working coil WC1 based on the voltage (for example, a voltage having an envelope form) supplied from the sub-filter unit 540, or may control an output of the first working coil WC1.

However, the control unit 250 may perform a target object detecting operation and an output control operation via separate routes.

That is, the control unit 250 may receive the level-converted voltage from the voltage distribution unit 520, convert the received voltage into a pulse signal, and determine whether or not the target object is located on the first working coil WC1 based on the converted pulse signal. In addition, the control unit 250 may control an output of the first working coil WC1 based on the filtered voltage supplied from the sub-filter unit 540.

As described above, the first detection unit D1 may detect various magnitudes of resonant currents in accordance with its intended use through first and second shunt resistors that are selectively driven, thereby improving resonant current detection accuracy. Furthermore, the control unit 250 may improve accuracy in relation to the target object detecting operation and the working coil output control operation by receiving resonant current information with improved accuracy from the first detection unit D1.

Subsequently, another example of the detection unit of FIG. 4 will be described with reference to FIG. 6.

In some implementations, the first to fourth detection units D1 to D4 have the same configuration, function and effect, and thus the first detection unit D1 will be described as an example. Also, the first detection unit D1 of FIG. 6 is the same as the first detection unit D1 of FIG. 5 except for a few components, and thus differences therebetween will be mainly described.

Figure 6:
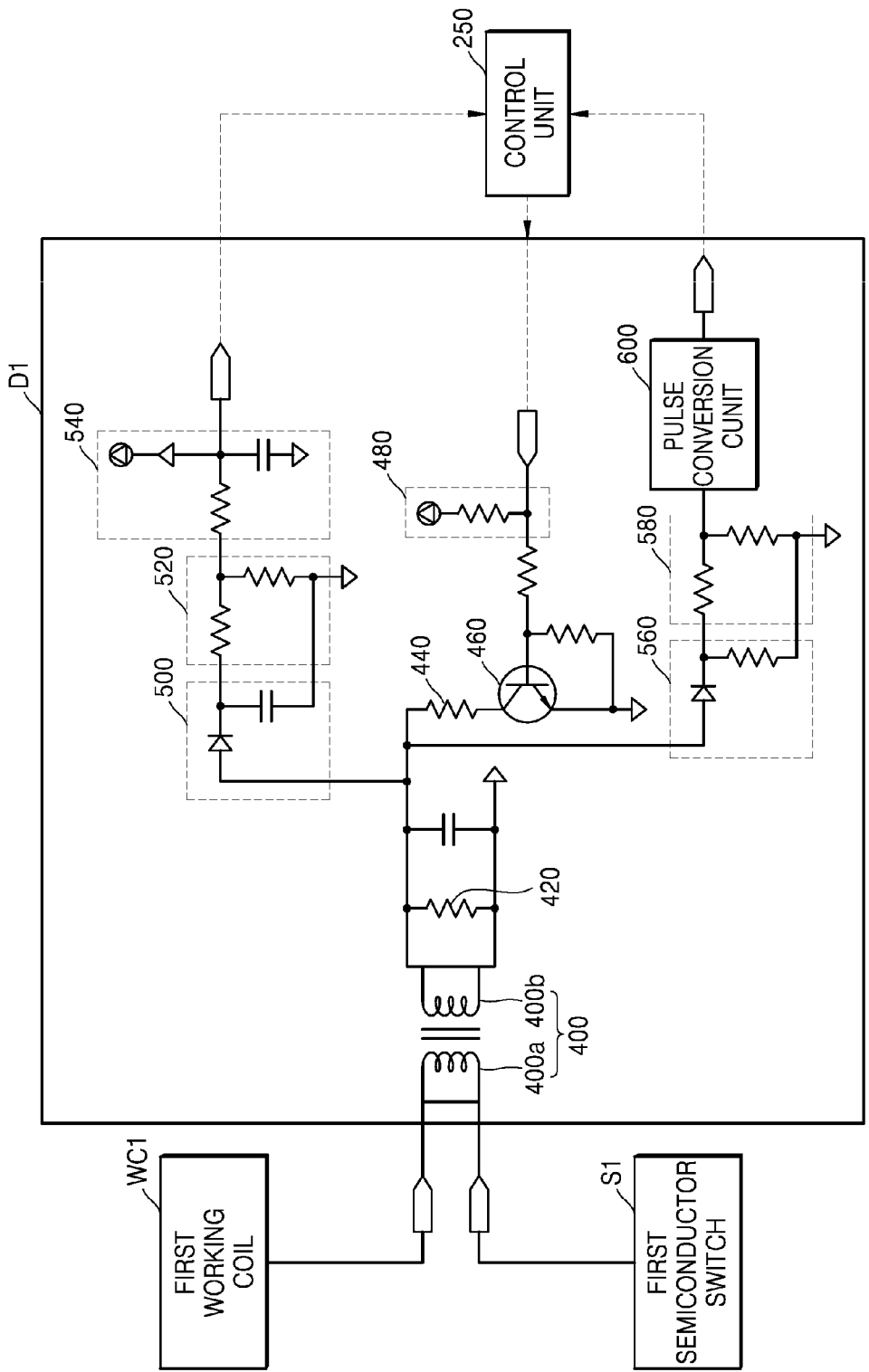
FIG. 6 is a schematic diagram illustrating another example of the detection unit of FIG. 4.

Referring to FIG. 6, the first detection unit D1 may further include a second sub-rectification unit 560 connected to the first and second resistors 420 and 440 to rectify the voltage converted through the first resistor 420, a second voltage distribution unit 580 to convert a level of the voltage rectified by the second sub-rectification unit 560 to a voltage level measurable by the control unit 250, and a pulse conversion unit 600 to convert the voltage whose level is converted by the second voltage distribution unit 580 into a pulse signal and supply the pulse signal to the control unit 250, unlike FIG. 5.

Here, the pulse conversion unit 600 may convert the voltage whose level is converted by the second voltage distributor 580 into a pulse signal through, for example, an operational amplifier (OP Amp) or a bipolar junction transistor (BJT) element, but is not limited thereto.

Also, the first detection unit D1 of FIG. 6 may further include a second sub-rectification unit 560 to rectify the voltage converted through the first resistor 420, and a first sub-rectification unit 500 (which is the same as the above-described sub-rectification unit 500) to rectify the voltage converted through the first and second resistors 420 and 440.

Thus, the first detection unit D1 of FIG. 6 may further include components (the second sub-rectification unit 560, second voltage distribution unit 580, and pulse conversion unit 600) for detecting a small magnitude of resonant current and components (the first sub-rectification unit 500, first voltage distribution unit 520, and sub-filter unit 540) for detecting a large magnitude of resonant current.

Also, the first detection unit D1 of FIG. 6 may include the pulse conversion unit 600, and thus may replace a function (that is, a function of converting information on the detected small magnitude of resonant current into a pulse) of the control unit 250 of FIG. 5.

Thus, the induction heating and wireless power transferring device 1 may have the above-described features and configurations.

Hereinafter, the target object detecting method will be described based on the above-described features and configurations of the induction heating and wireless power transferring device 1.

Figure 7:
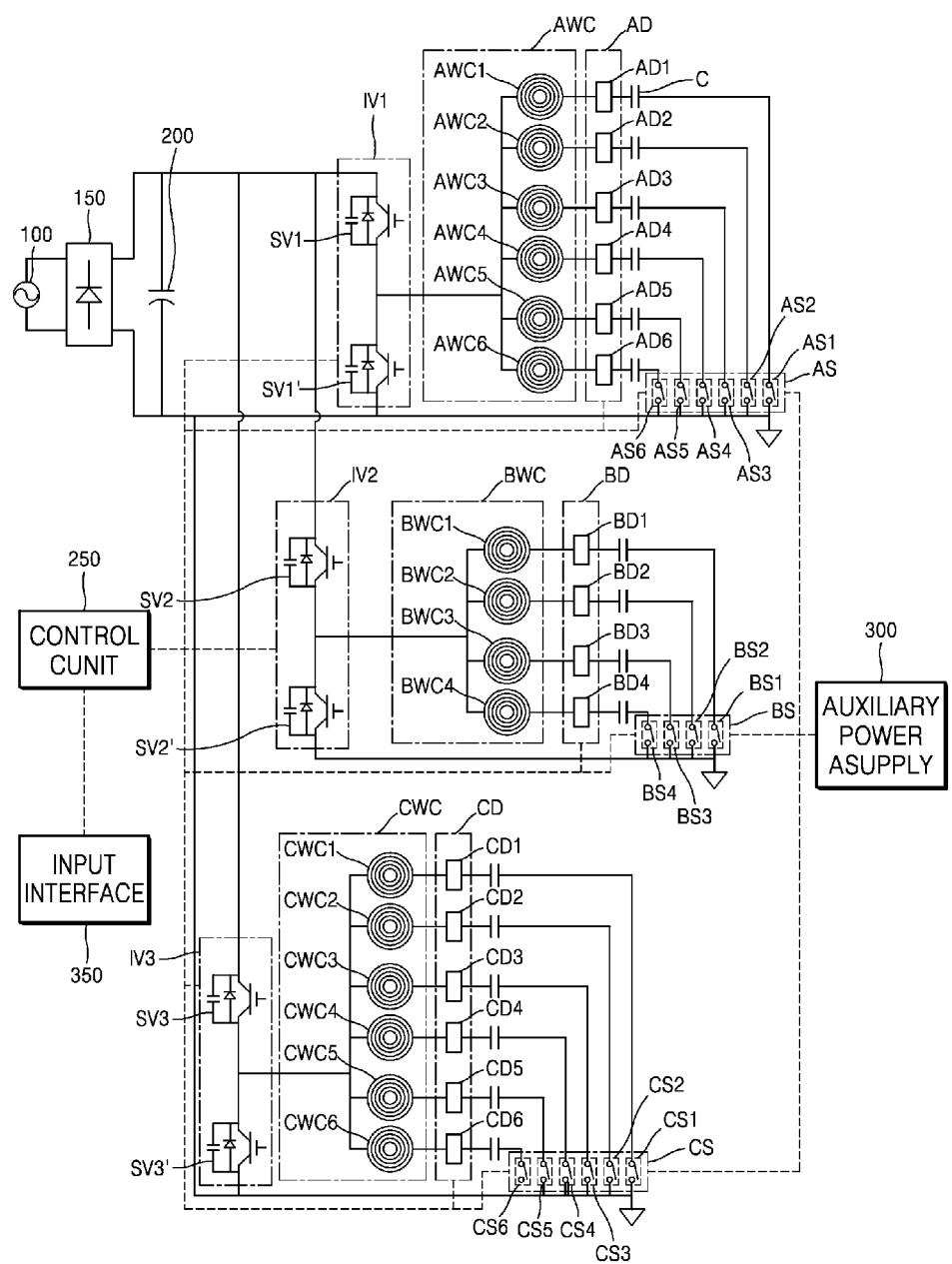
FIG. 7 is a circuit diagram specifically illustrating an example of a method for detecting a target object by the induction heating and wireless power transferring device of FIG. 4.
Figure 8:
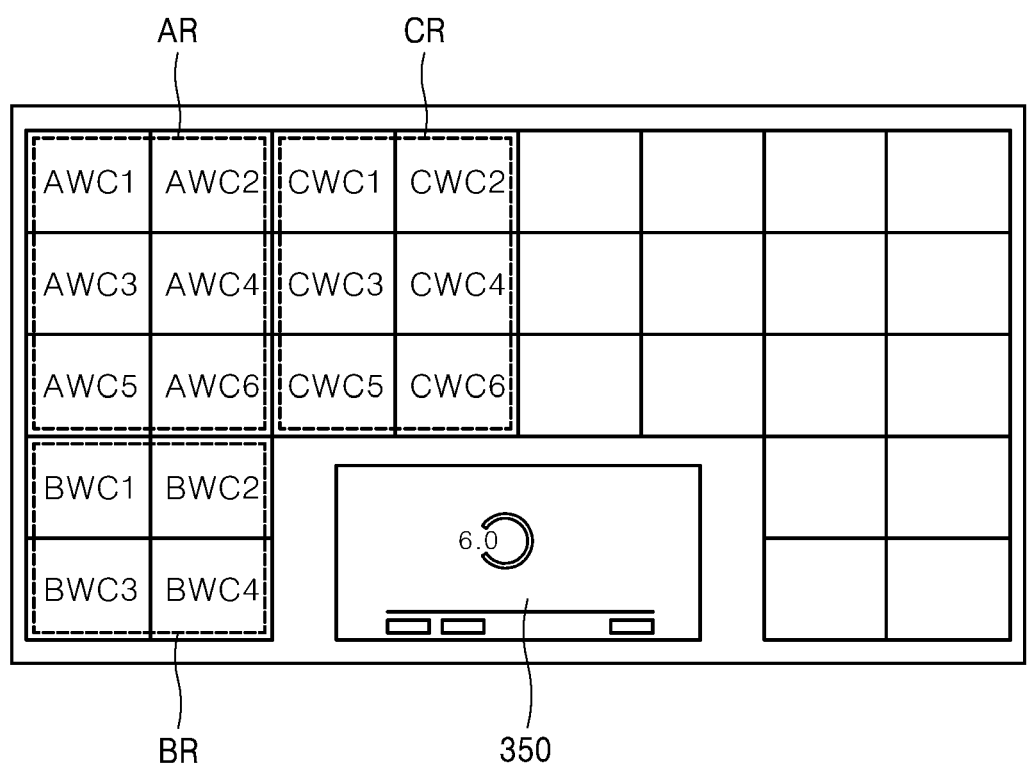
FIG. 8 is a schematic diagram illustrating an example arrangement of a working coil of FIG. 7.
Figure 9:
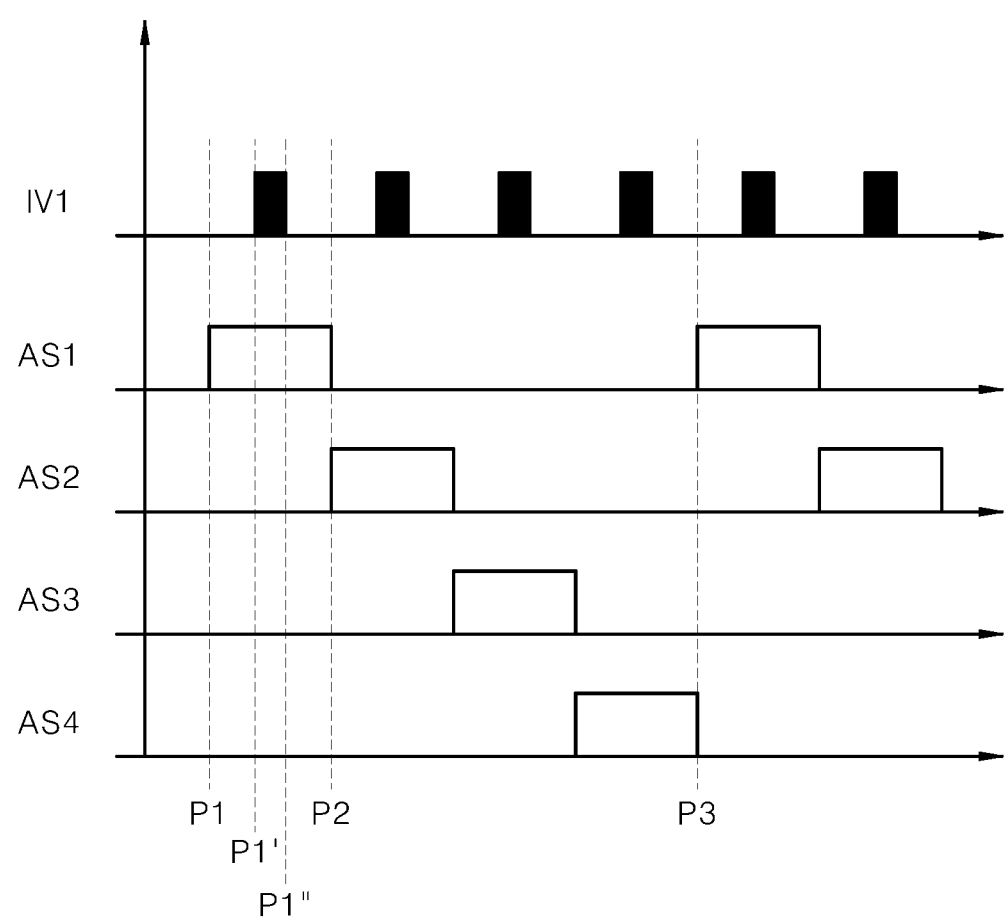
FIG. 9 is a schematic diagram illustrating an example of a method for detecting a target object by the induction heating and wireless power transferring device of FIG. 7.
Figure 10:
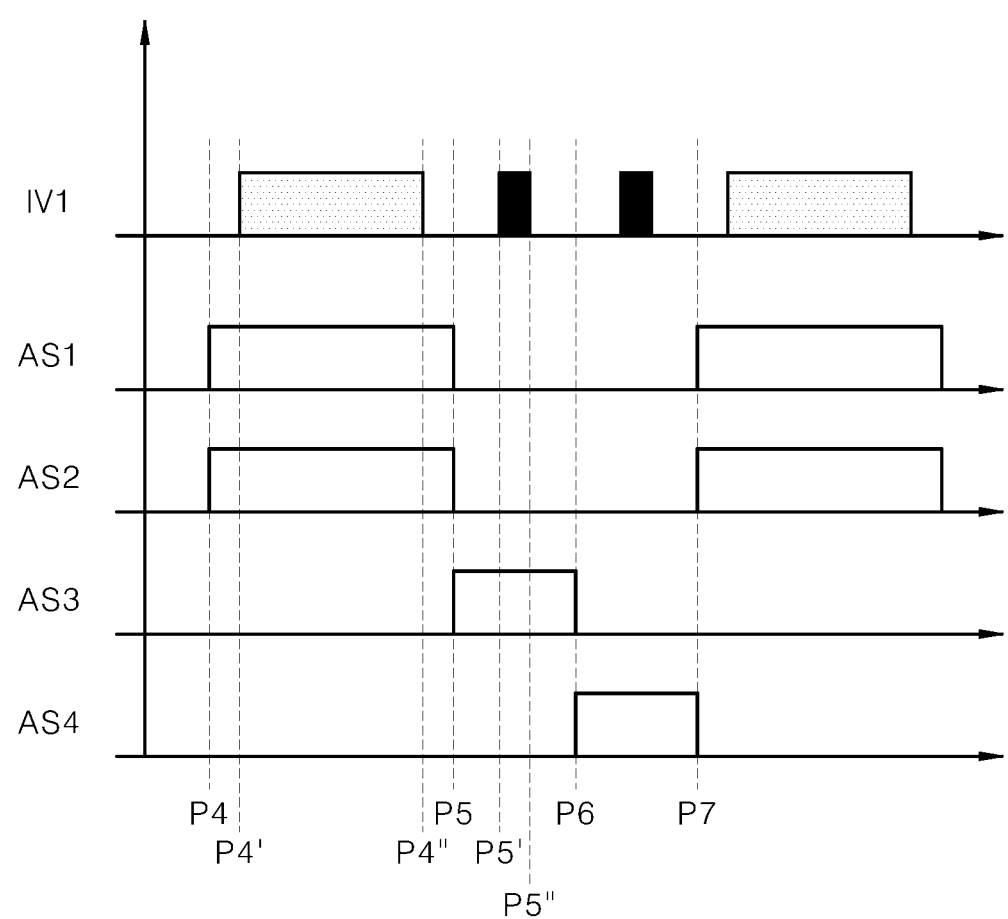
FIG. 10 is a schematic diagram illustrating another example of a method for detecting a target object by the induction heating and wireless power transferring device of FIG. 7.

FIG. 7 is a circuit diagram specifically illustrating an example of a method for detecting a target object by the induction heating and wireless power transferring device of FIG. 4. FIG. 8 is a schematic diagram illustrating an example arrangement of the working coil of FIG. 7. FIG. 9 is a schematic diagram illustrating an example of a method for detecting a target object by the induction heating and wireless power transferring device of FIG. 7. FIG. 10 is a schematic diagram illustrating another example of a method for detecting a target object by the induction heating and wireless power transferring device of FIG. 7.

In some implementations, the induction heating and wireless power transferring device of FIG. 7 may be the induction heating and wireless power transferring device of FIG. 4. However, in some other implementations, modifications or variations can be made to the induction heating and wireless power transferring device of FIG. 7 to implement the induction heating and wireless power transferring device of FIG. 4.

Firstly, referring to FIG. 7, an induction heating and wireless power transferring device 1 may include a power supply unit 100, a rectification unit 150, a DC link capacitor 200, first to third inverter units IV1-IV3, first to third working coil units AWC, BWC and CWC, first to third detection groups AD-CD, first to third semiconductor switch units AS, BS and CS, a control unit 250, an auxiliary power supply 300, and an input interface 350.

With reference to FIG. 8, the working coils in FIG. 7 are arranged at a half of an entire region (a zone free region). In order to arrange working coils at the other half of the entire region, the induction heating and wireless power transferring device in FIG. 7 may further include one or more additional components such as an inverter unit, a working coil unit, a working coil, a detection group, a detection unit, a semiconductor switch unit, and a semiconductor switch.

But, in implementations of this application, the inverter unit, working coil unit, working coil, detection group, detection unit, semiconductor switch unit, and semiconductor switch of FIG. 7 will be described as an example for ease of explanation.

Specifically, the power supply unit 100 may output AC power and supply the AC power to the rectification unit 150, and the rectification unit 150 may convert the AC power supplied from the power supply unit 100 into DC power and supply the DC power to the DC link capacitor 200.

Here, the DC link capacitor 200 may be connected in parallel to the rectification unit 150.

Specifically, the DC link capacitor 200 may be connected in parallel to the rectification unit 150 to receive a DC voltage from the rectification unit 150. Also, the DC link capacitor 200 may be, for example, a smoothing capacitor, thereby reducing ripple of the supplied DC voltage.

In some implementations, the DC link capacitor 200 may receive a DC voltage from the rectification unit 150. The DC voltage may be applied to one end of the DC link capacitor 200, and the other end of the DC link capacitor 200 may be grounded by a potential difference between one end and the other end of the DC link capacitor 200.

Also, DC power (or a DC voltage) that is rectified by the rectification unit 150 and has ripple reduced by the DC link capacitor 200 may be supplied to at least one of the first to third inverter units IV1-IV3.

The first inverter unit IV1 may include two switching elements SV1 and SV1', the second inverter unit IV2 may include two switching elements SV2 and SV2', and the third inverter unit IV3 may include two switching elements SV3 and SV3'.

Also, the switching elements included in the respective inverter units IV1-IV3 may be alternately turned on and off by a switching signal supplied from the control unit 250 to convert the DC power into a high-frequency AC (i.e., a resonant current), and the converted high-frequency AC may be supplied to a working coil For example, a resonant current converted by the switching operation of the first inverter unit IV1 may be supplied to the first working coil unit AWC, and a resonant current converted by the switching operation of the second inverter unit IV2 may be supplied to the second working coil unit BWC. Also, a resonant current converted by the switching operation of the third inverter unit IV3 may be supplied to the third working coil unit CWC.

A resonant current generated by the first inverter unit IV1 may be applied to at least one of the working coils AWC1-AWC6 included in the first working coil unit AWC, and a resonant current generated by the second inverter unit IV2 may be applied to at least one of the working coils BWC1-BWC4 included in the second working coil unit BWC. Also, a resonant current generated by the third inverter unit IV3 may be applied to at least one of the working coils CWC1-CWC6 included in the third working coil unit CWC.

Here, the working coils AWC1-AWC6 included in the first working coil unit AWC may be connected in parallel to one another, and the working coils BWC1-BWC4 included in the second working coil unit BWC may be also connected in parallel to one another. Also, the working coils CWC1-CWC6 included in the third working coil unit CWC may be connected in parallel to one another.

With reference to FIG. 8, the working coils AWC1-AWC6 included in the first working coil unit AWC may be grouped and disposed in a region A (AR), and the working coils BWC1-BWC4 included in the second working coil unit BWC may be grouped and disposed in a region B (BR). Also, the working coils CWC1-CWC6 included in the third working coil unit CWC may be grouped and disposed in a region C (CR).

The working coils may be also disposed in the other empty space, and the input interface 350 may be also disposed at a location other than the location illustrated in FIG. 8.

Referring back to FIG. 7, the first semiconductor switch unit AS may be connected to the first working coil unit AWC, the second semiconductor switch unit BS may be connected to the second working coil unit BWC, and the third semiconductor switch unit CS may be connected to the third working coil unit CWC.

Specifically, the first semiconductor switch unit AS may include six semiconductor switches AS1-AS6, and the six semiconductor switches AS1-AS6 may be respectively connected to the six working coils AWC1-AWC6 included in the first working coil unit AWC to respectively turn on or off the six working coils AWC1-AWC6.

Here, one ends of the six semiconductor switches AS1-AS6 may be respectively connected to the six working coils AWC1-AWC6, and the other ends of the six semiconductor switches AS1-AS6 may be connected to the other end (i.e., a ground terminal) of the DC link capacitor 200.

Further, the second semiconductor switch unit BS may include four semiconductor switches BS1-BS4, and the four semiconductor switches BS1-BS4 may be respectively connected to the four working coils BWC1-BWC4 included in the second working coil unit BWC to respectively turn on or off the four working coils BWC1-BWC4.

Here, one ends of the four semiconductor switches BS1-BS4 may be respectively connected to the four working coils BWC1-BWC4, and the other ends of the four semiconductor switches BS1-BS4 may be connected to the other end (i.e., a ground terminal) of the DC link capacitor 200.

Further, the third semiconductor switch unit CS may include six semiconductor switches CS1-CS6, and the six semiconductor switches CS1-CS6 may be respectively connected to the six working coils CWC1-CWC6 included in the third working coil unit CWC to respectively turn on or off the six working coils CWC1-CWC6.

Here, one ends of the six semiconductor switches CS1-CS6 may be respectively connected to the six working coils CWC1-CWC6, and the other ends of the six semiconductor switches CS1-CS6 may be connected to the other end (i.e., a ground terminal) of the DC link capacitor 200.

That is, the other ends of all semiconductor switches of the first to third semiconductor switch units AS, BS and CS may be connected to the other end (i.e., a ground terminal) of the DC link capacitor 200. As a result, the auxiliary power supply 300 may supply power to all semiconductor switches through one output terminal.

In some implementations, when the semiconductor switch is connected between the inverter unit and the working coil unit, emitters of the respective semiconductor switches may be floated with respect to one other, and accordingly the number of output terminals of the auxiliary power supply 300 may increase by the number of the semiconductor switches. As a result, the number of pins of the auxiliary power supply 300 may also increase, leading to an increase in a volume of a circuit.

On the other hand, as in an implementation of this application, when all semiconductor switches are connected to the ground terminal (i.e., the other end of the DC link capacitor 200), the emitters of the semiconductor switches may be all common without being floated. Therefore, the auxiliary power supply 300 may supply power to all semiconductor switches through one output terminal. Also, the number of pins of the auxiliary power supply 300 may be reduced in comparison to a case where the emitter of the semiconductor switch is floated, and further, the volume of the circuit may be also reduced.

The other ends of all semiconductor switches may be connected to one end of the DC link capacitor 200 (i.e., a portion to which a DC voltage is applied). Also, when the single output capacity of the auxiliary power supply 300 is too large (i.e., when the single output capacity is significantly out of a predetermined reference capacity), the other ends of the semiconductor switches included in some semiconductor switch units may be connected to the other end (i.e., a ground terminal) of the DC link capacitor 200, and the other ends of the semiconductor switches included in the other semiconductor switch units may be connected to one end of the DC link capacitor 200 (i.e., a portion to which a DC voltage is applied).

But, in an implementation of this application, a configuration in which all semiconductor switches are connected to the ground terminal (i.e., the other end of the DC link capacitor 200) will be described as an example for ease of explanation.

The induction heating and wireless power transferring device 1 may further include a resonant capacitor (for example, C) connected between the working coil and the semiconductor switch (i.e., between the detection unit and the semiconductor switch).

When a voltage is applied by the switching operation of the inverter unit (for example, the first inverter unit IV1), the resonant capacitor C may begin to resonate. Further, when the resonant capacitor C resonates, a current flowing through the working coil (for example, AWC1) connected to the resonant capacitor C may rise.

Through such a process, an eddy current may be induced to a target object that is disposed on the working coil AWC1 connected to the resonant capacitor C.

For reference, the resonant capacitor may be located between the working coil and the detection unit. But, in implementations of this application, a configuration in which the resonant capacitor is located between the detection unit and semiconductor switch will be described as an example for ease of explanation.

The first to third detection groups AD, BD and CD may be respectively connected to the first to third working coil units AWC, BWC and CWC to detect a resonant current flowing through a corresponding working coil.

Specifically, the first detection group AD may include six detection units AD1-AD6, and the six detection units AD1-AD6 may be respectively connected to six working coils AWC1-AWC6 included in the first working coil unit AWC to detect resonant currents applied to the six working coils AWC1-AWC6.

Here, each of the six detection units AD1 to AD6 may supply information on the detected resonant current to the control unit 250 in various forms.

For example, when a large magnitude of resonant current is detected, the detection unit may convert the resonant current into a voltage signal having an envelope form and supply the voltage signal to the control unit 250. When a small magnitude of resonant current is detected, the detection unit may convert the resonant current into a signal having a pulse form and supply the signal to the control unit 250.

Also, the second detection group BD may include four detection units BD1-BD4, and the four detection units BD1-BD4 may be respectively connected to four working coils BWC1-BWC4 included in the second working coil unit BWC to detect resonant currents applied to the four working coils BWC1-BWC4.

Here, each of the four detection units BD1-BD4 may supply information on the detected resonant current to the control unit 250 in various forms, as described above.

Further, the third detection group CD may include six detection units CD1-CD6, and the six detection units CD1-CD6 may be respectively connected to six working coils CWC1-CWC6 included in the third working coil unit CWC to detect resonant currents applied to the six working coils CWC1-CWC6.

Here, each of the six detection units CD1-CD6 may supply information on the detected resonant current to the control unit 250 in various forms, as described above.

The control unit 250 may control respective operations of the first to third inverter units IV1-IV3, the first to third detection groups AD, BD and CD, and the first to third semiconductor switch units AS, BS and CS.

That is, the control unit 250 may supply a switching signal to control the operations of the respective inverter units IV1-IV3, supply a control signal to control the respective detection units AD1-AD6, BD1-BD4 and CD1-CD6, and may supply a control signal to control the respective semiconductor switches AS1-AS6, BS1-BS4 and CS1-CS6.

Further, the control unit 250 may also receive information on the resonant currents applied to the working coils AWC1-AWC6, BWC1-BWC4 and CWC1-CWC6 from the detection units AD1-AD6, BD1-BD4 and CD1-CD6 included in the first to third detection groups AD, BD and CD. And, the control unit 250 may determine a working coil with a target object located thereon based on the received information on the resonant currents or may control outputs of the working coils.

That is, the control unit 250 may control respective operations of the first to third inverter units IV1-IV3, the detection units AD1-AD6, BD1-BD4 and CD1-CD6 included in the first to third detection groups AD, BD and CD, the semiconductor switches AS1-AS6, BS1-BS4 and CS1-CS6 included in the first to third semiconductor switch units AS, BS and CS to detect a working coil with a target object located thereon among the working coils AWC1-AWC6, BWC1-BWC4 and CWC1-CWC6 included in the first to third working coil units AWC, BWC and CWC, or may control respective outputs of the working coils AWC1-AWC6, BWC1-BWC4 and CWC1-CWC6.

Here, one example of a method to detect a target object by the induction heating and wireless power transferring device 1 will be described with reference to FIGS. 7 and 9.

For ease of explanation, a process of detecting a target object in the region A (AR of FIG. 8) where the first working coil unit AWC is disposed will be described as an example, assuming that the first working coil unit AWC includes four working coils and the first semiconductor switch unit AS includes four semiconductor switches AS1-AS4 that are respectively connected to the four working coils.

Referring to FIGS. 7 and 9, the control unit 250 may supply N pulses (here, N is any one of 1, 2 and 3, and when N is 1, a one pulse shot is supplied to the first inverter unit IV1 as a switching signal) to the first inverter IV1 every predetermined cycle to detect a location of the target object.

Every time the N pulses are supplied from the control unit 250, the first inverter unit IV1 may be turned on and off accordingly. As a result, free resonance may occur in a circuit including the first working coil unit AWC.

Here, when the control unit 250 supplies continuous pulses (i.e., four or more pulses) instead of the N pulses, a problem may occur in the standby power. Thus, the control unit 250 may cyclically supply the N pulses to the first inverter unit IV1.

Hereinafter, for ease of explanation, a case where the N pulses are one pulse (i.e., a single pulse) will be described as an example.

The control unit 250 may sequentially turn on or off the four semiconductor switches AS1-AS4 in line with each single pulse before a location of the target object is detected.

That is, the control unit 250 may turn on the first semiconductor switch AS1 at a first time point P1, and then may supply a single pulse to the first inverter unit IV1 when a first delay during a certain period of time P1-P1' has elapsed. Here, the reason for having a first delay elapsed time is that a certain period of time is required for the first semiconductor switch AS1 to be stabilized after being turned on.

Subsequently, after the single pulse is supplied to the first inverter unit IV1, a second delay during a certain period of time P1"-P2 may elapse again. Here, the reason for having a second delay elapsed time is that a certain period of time is required to perform a signal processing operation and a target object detecting operation for the single pulse supplied to the first inverter unit IV1.

When the target object is not detected before a second time point P2 when a predetermined cycle has elapsed after the first time point P1, the control unit 250 may turn off the first semiconductor switch AS1 and turn on the second semiconductor switch AS2, and then may supply the single pulse to the first inverter unit IV1 again.

In addition, the control unit 250 may sequentially repeat the above-described process for the third and fourth semiconductor switches AS3 and AS4 until the target object is detected.

But, when the target object is not detected before a third time point P3, the control unit 250 may turn off the fourth semiconductor switch AS4 and turn on the first semiconductor switch AS1 at the third time point P3, and then may supply the single pulse to the first inverter unit IV1 again, thereby repeating the above-described process.

In some implementations, when the single pulse is supplied to the first inverter unit IV1 after the first semiconductor switch AS1 is turned on, the resonant current may flow only through the first working coil AWC1. At this time, a first detection unit AD1 may detect a resonant current flowing through the first working coil AWC1 and supply information on the detected resonant current to the control unit 250. Also, the control unit 250 may detect whether or not the target object is located on the first working coil AWC1 based on the information on the resonant current supplied from the first detection unit AD1.

Additionally, when s target object is located on the first working coil AWC1, a resistance of the target object may increase a total resistance, resulting in a change in a value of the resonant current flowing through the first working coil AWC1 (that is, an increase in an attenuation degree of the resonant current).

That is, when the first detection unit AD1 detects the resonant current flowing through the first working coil AWC1 and supplies information on the detected resonant current to the control unit 250, the first detection unit AD1 may supply information on a change in the number of pulses (for example, a decrease in the number of pulses) or a change in a pulse width (for example, a decrease in the pulse width) resulting from the attenuation of the resonant current.

Accordingly, when the first detection unit AD1 detects the resonant current flowing through the first working coil AWC1 and then supplies information on the detected resonant current to the control unit 250, the control unit 250 may detect whether or not the target object is present on the first working coil AWC1 based on the information on the detected resonant current.

As described above, with respect to the second to fourth working coils AWC2-AWC4, the control unit 250 may sequentially detect whether or not a target object is located thereon, and may continuously repeat this process.

Further, the above-described target object detecting operation for the first working coil unit AWC may be also performed in the same manner for the second and third working coil units BWC and CWC.

Subsequently, another example of a method to detect a target object by the induction heating and wireless power transferring device 1 will be described with reference to FIGS. 7 and 10.

For ease of explanation, a process of detecting a target object in the region A (AR of FIG. 8) where the first working coil unit AWC is disposed will be described as an example, assuming that the first working coil unit AWC includes four working coils and the first semiconductor switch unit AS includes four semiconductor switches AS1-AS4 that are respectively connected to the four working coils.

Referring to FIGS. 7 and 10, when a target object is detected on the first and second working coils AWC1 and AWC2, the control unit 250 may turn on the first and second semiconductor switches AS1 and AS2 at a fourth time point P4, and then may supply a switching signal whose frequency and phase are adjusted to correspond to a power level (i.e., a heating intensity or a power transferring amount) input from the user to the first inverter unit IV1.

As a result, a resonant current may be applied to the first and second working coils AWC1 and AWC2, and the target object located on the first and second working coils may be inductively heated or receive power in a wireless manner.

At this time, the control unit 250 may also supply the switching signal to the first inverter unit IV1 when a third delay during a certain period of time P4-P4' has elapsed after the first and second semiconductor switches AS1 and AS2 are turned on. The reason for having a third delay elapsed time is that a certain period of time is required for the first and second semiconductor switches AS1 and AS2 to be stabilized after being turned on.

In some implementations, the control unit 250 may control outputs of the first and second working coils AWC1 and AWC2 based on information on the resonant currents applied to the first and second working coils AWC1 and AWC2 supplied from the first and second detection units AD1 and AD2.

That is, the control unit 250 may adjust a frequency and phase of a switching signal to be supplied to the first and second working coils AWC1 and AWC2 based on the information on the resonant currents flowing through the first and second working coils AWC1 and AWC2. Accordingly, the frequency and phase of the switching signal to be supplied to the first and second working coils AWC1 and AWC2 may be adjusted to correspond to the power level input from the user.

Also, the control unit 250 may continuously detect whether or not another target object other than the target object (i.e., the target object located on the first working coil AWC1 and the second working coil AWC2) is located on a working coil that is not driven (i.e., the third working coil AWC3 or the fourth working coil AWC4).

That is, the control unit 250 may stop supplying the switching signal to the first inverter unit IV1 to detect whether or not another object is located on the working coil that is not driven.

Specifically, when a fourth delay during a certain period of time P4"-P5 has elapsed after stopping the supply of the switching signal, the control unit 250 may turn off the first and second semiconductor switches AS1 and AS2 and turn on the third semiconductor switch AS3 simultaneously with the start of a predetermined period of time P5-P7 (for example, a period of time that corresponds to the number of working coils that are not driven X a predetermined cycle). Then, the control unit 250 may supply a single pulse to the first inverter unit IV1 within a predetermined period of time.

Here, the reason for having a fourth delay elapsed time is that a certain period of time is required to perform a signal processing operation for the switching signal supplied to the first inverter unit IV1.

For the same reason as described above, when the control unit 250 supplies a single pulse to the first inverter unit IV1 within a predetermined period of time, the control unit 250 may have a delay during a period of time of P5-P5' and P5"-P6 before and after a time point of supplying the single pulse.

The control unit 250 may sequentially turn on or off the third and fourth semiconductor switches AS3 and AS4 at a predetermined cycle in the same manner as the above-described method in order to detect another target object.

Also, when another target object is not detected on the third working coil AWC3 or the fourth working coil AWC4 before a predetermined period of time (for example, P5-P7) ends, the control unit 250 may turn off the fourth semiconductor switch AS4 and turn on the first and second semiconductor switches AS1 and AS2 simultaneously with the end of the predetermined period of time (i.e., a seventh time point P7). Then, the control unit 250 may supply the above-described switching signal to the first inverter unit IV1 again.

In some implementations, with reference to FIG. 8, the third semiconductor switch AS3 is already turned off at a sixth time point P6, and the switching signal supplied to the first inverter unit IV1 after the seventh time point P7 is a switching signal whose frequency and phase are adjusted to correspond to the power level input from the user Thus, even after a target object is detected, the control unit 250 may continuously detect whether or not another target object is located on a working coil that is not driven.

The above-described target object detecting operation for the first working coil unit AWC may be also performed in the same manner for the second and third working coil units BWC and CWC.

As described above, the induction heating and wireless power transferring device 1 may independently distinguish a plurality of working coils AWC1-AWC6, BWC1-BWC4 and CWC1-CWC6 from one another through the semiconductor switches AS1-AS6, BS1-BS4 and CS1-CS6 and the control unit 250, and accordingly may turn on or off the plurality of working coils AWC1-AWC6, BWC1-BWC4 and CWC1-CWC6 at high speed, thereby improving target object detection speed and algorithm. Further, it is possible to detect various magnitudes of resonant currents through first and second shunt resistors that are selectively driven, thereby improving resonant current detection accuracy. Furthermore, it is possible to improve accuracy in relation to the target object detecting operation and the working coil output control operation by improving the resonant current detection accuracy.

Also, the induction heating and wireless power transferring device 1 may perform the target object detecting operation and the working coil output control operation by using the semiconductor switches AS1-AS6, BS1-BS4 and CS1-CS6, the detection units AD1-AD6, BD1-BD4 and CD1-CD6, and the control unit 250 instead of a relay and a target object detection circuit, thereby solving a noise problem occurring when a switching operation of the relay is performed. As a result, it is possible to improve user satisfaction. Further, the induction heating and wireless power transferring device 1 may improve ease of use because the user may use the induction heating and wireless power transferring device 1 quietly during noise-sensitive time zones (for example, at dawn or late at night). In addition, the induction heating and wireless power transferring device 1 may reduce a volume of a circuit by removing the relay and the target object detection circuit that occupy a large portion of an area of the circuit, thereby reducing an overall volume of the induction heating and wireless power transferring device 1. As a result, it is possible to improve space utilization.

Since various substitutions, changes, and modifications can be made within the scope that does not deviate the technical idea of this application for those skilled in the art to which this application pertains, this above-mentioned application is not limited by the above-mentioned implementations and the accompanying drawings.

What is claimed is:

1. A device configured to inductively heat one or more objects and to wirelessly transfer power to one or more objects, the device comprising:
    a first working coil;
    an inverter including a plurality of switching elements, the inverter being configured to generate a resonant current based on a switching operation of the plurality of switching elements and to apply the resonance current to the first working coil;
    a current transformer connected to the first working coil and configured to change a magnitude of the resonant current applied to the first working coil;
    a first resistor connected to the current transformer, the first resistor having a first resistance value;
    a second resistor connected to the first resistor, the second resistor having a second resistance value less than the first resistance value;
    a control switch connected to the second resistor and configured to selectively allow flow of current through the second resistor; and
    a controller configured to:
        provide a switching signal to the inverter,
        provide a control signal to the control switch,
        based on a voltage applied to the first resistor, determine whether a target object is located at a location corresponding to the first working coil, or
        based on a voltage applied to a composite resistor including the first resistor and the second resistor, control output of the first working coil.

2. The device of claim 1, wherein the first resistor is configured to, based on the controller turning off the control switch, convert the resonant current to a first voltage, the resonant current having the magnitude changed by the current transformer, and
    wherein the first resistor and the second resistor are configured to, based on the controller turning on the control switch, convert the resonant current to a second voltage according to a composite resistance value of the first resistor and the second resistor, the resonant current having the magnitude changed by the current transformer.

3. The device of claim 2, wherein the controller is further configured to:
    turn on the control switch by supplying a first level signal to the control switch; and
    turn off the control switch by supplying a second level signal to the control switch, the second level signal being different from the first level signal.

4. The device of claim 2, further comprising a pull-up resistor that is configured to invert a high level signal to a low level signal and that is configured to invert the low level signal to the high level signal, and
    wherein the controller is further configured to:
        turn off the control switch by supplying the high level signal to the control switch, and
        turn on the control switch by supplying the low level signal to the control switch.

5. The device of claim 1, further comprising:
    a sub-rectifier connected to the first resistor and to the second resistor, the sub-rectifier being configured to rectify a first voltage converted through the first resistor or to rectify a second voltage converted through the first resistor and the second resistor;
    a voltage distributor configured to generate a distribution voltage by converting a level of the rectified first voltage or a level of the rectified second voltage, the distribution voltage having a voltage level within a voltage measurement range of the controller; and
    a sub-filter configured to filter the distribution voltage and to supply the filtered distribution voltage to the controller, the sub-filter comprising a diode configured to limit the voltage level provided to the controller.

6. The device of claim 5, wherein the controller is further configured to:
    receive the distribution voltage from the voltage distributor;
    convert the received distribution voltage into a pulse signal;
    based on the pulse signal, determine whether the target object is located at the location corresponding to the first working coil; and
    control output of the first working coil based on the filtered distribution voltage supplied from the sub-filter.

7. The device of claim 1, further comprising:
    a first sub-rectifier connected to the first resistor and to the second resistor, the first sub-rectifier being configured to rectify a first voltage converted through the first resistor and the second resistor;
    a first voltage distributor configured to generate a first distribution voltage by converting a level of the rectified first voltage to a first voltage level within a voltage measurement range of the controller;
    a sub-filter configured to filter the first distribution voltage and to supply the filtered first distribution voltage to the controller, the sub-filter comprising a diode configured to limit the first voltage level provided to the controller;
    a second sub-rectifier connected to the first resistor and to the second resistor, the second sub-rectifier being configured to rectify a second voltage converted through the first resistor;
    a second voltage distributor configured to generate a second distribution voltage by converting a level of the rectified second voltage to a second voltage level within the voltage measurement range of the controller; and
    a pulse converter configured to convert the second distribution voltage into a pulse signal and to supply the pulse signal to the controller.

8. The device of claim 7, wherein the controller is further configured to:
    determine whether the target object is located at the location corresponding to the first working coil based on the pulse signal supplied from the pulse converter; and
    control output of the first working coil based on the filtered first distribution voltage supplied from the sub-filter.

9. The device of claim 1, wherein:
the current transformer is connected electrically in series to the first working coil;
the first resistor is connected electrically in parallel to the current transformer;
the second resistor is connected electrically in parallel to the first resistor; and
the control switch is connected electrically in series to the second resistor.

10. The device of claim 1, wherein the controller is further configured to, based on a determination that the target object is located at the location corresponding to the first working coil, control output of the first working coil.

11. The device of claim 1, wherein the plurality of switching elements are connected electrically in parallel to a power supply.

12. The device of claim 11, wherein the plurality of switching elements comprises a first switching element and a second switching element, and
wherein the first working coil is connected to a node between the first switching element and the second switching element.

13. The device of claim 1, wherein the controller is further configured to:
determine a type of the target object; and
based on the type of the target object, control the first working coil to heat the target object or to electrically charge the target object.

14. The device of claim 1, wherein the controller is further configured to, based on a number of pulses or a frequency of the resonant current, determine whether the target object is present at the location corresponding to the first working coil.

15. The device of claim 14, wherein the controller is further configured to, based on the number of pulses or the frequency of the resonant current, determine a relative position of the target object with respect to a center of the first working coil.

16. The device of claim 1, further comprising a second working coil connected electrically in parallel to the first working coil,
wherein the controller is further configured to:
based on a determination that an object is located at a first position corresponding to the first working coil, control output of the first working coil; and
based on a determination that an object is located at a second position corresponding to the second working coil, control output of the second working coil.

17. The device of claim 1, further comprising:
a second working coil connected electrically in parallel to the first working coil;
a first semiconductor switch connected to the first working coil and configured to turn on the first working coil and to turn off the first working coil;
a second semiconductor switch connected to the second working coil and configured to turn on the second working coil and to turn off the second working coil;
a power supply configured to supply power to the inverter; and
an auxiliary power supply configured to supply power to the first semiconductor switch and to the second semiconductor switch.

* * * * *